(12) United States Patent
Prevost et al.

(10) Patent No.: US 11,761,486 B2
(45) Date of Patent: *Sep. 19, 2023

(54) POLYCRYSTALLINE DIAMOND BEARINGS FOR ROTATING MACHINERY WITH COMPLIANCE

(71) Applicant: XR Reserve LLC, Houston, TX (US)

(72) Inventors: Gregory Prevost, Spring, TX (US); William W. King, Houston, TX (US); David P. Miess, Spring, TX (US)

(73) Assignee: XR Reserve LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,410

(22) Filed: Mar. 4, 2022

(65) Prior Publication Data

US 2022/0243764 A1 Aug. 4, 2022

Related U.S. Application Data

(63) Continuation of application No. 16/812,016, filed on Mar. 6, 2020, now Pat. No. 11,286,985, which is a
(Continued)

(51) Int. Cl.
| | |
|---|---|
| *F16C 33/04* | (2006.01) |
| *F16C 33/26* | (2006.01) |
| *F16C 27/02* | (2006.01) |

(52) U.S. Cl.
CPC ........... *F16C 33/043* (2013.01); *F16C 27/02* (2013.01); *F16C 33/26* (2013.01); *F16C 2206/04* (2013.01)

(58) Field of Classification Search
CPC ........ F16C 17/03; F16C 27/02; F16C 33/043; F16C 33/26
See application file for complete search history.

(56) References Cited

U.S. PATENT DOCUMENTS

| | | |
|---|---|---|
| 1,798,604 A | 3/1931 | Hoke |
| 1,963,956 A | 6/1934 | James |
| (Continued) | | |

FOREIGN PATENT DOCUMENTS

| | | |
|---|---|---|
| DE | 4226986 A1 | 2/1994 |
| DE | 29705983 U1 | 6/1997 |
| (Continued) | | |

OTHER PUBLICATIONS

Bovenkerk, Dr. H. P.; Bundy, Dr. F. P.; Hall, Dr. H. T.; Strong, Dr. H. M.; Wentorf, Jun., Dr. R. H.; Preparation of Diamond, Nature, Oct. 10, 1959, pp. 1094-1098, vol. 184.
(Continued)

*Primary Examiner* — James Pilkington
(74) *Attorney, Agent, or Firm* — Michael S. McCoy; Amatong McCoy LLC

(57) ABSTRACT

Methods and apparatus for providing compliance in bearings of rotating machinery are provided. The rotating machinery may include a drive shaft movably coupled within a bearing housing. Compliant bearing assemblies may interface engagement between the drive shaft and the bearing housing, including polycrystalline diamond bearing elements, each with an engagement surface, and an opposing engagement surface of a metal that contains diamond solvent-catalyst.

31 Claims, 14 Drawing Sheets

Related U.S. Application Data continuation-in-part of application No. 16/049,608, filed on Jul. 30, 2018, now Pat. No. 10,738,821.

(60) Provisional application No. 62/845,131, filed on May 8, 2019.

(56) References Cited

U.S. PATENT DOCUMENTS

| | | |
|---|---|---|
| 2,259,023 A | 10/1941 | Clark |
| 2,299,978 A | 10/1942 | Hall |
| 2,407,586 A | 9/1946 | Summers |
| 2,567,735 A | 9/1951 | Scott |
| 2,693,396 A | 11/1954 | Gondek |
| 2,758,181 A | 8/1956 | Crouch |
| 2,788,677 A | 4/1957 | Hayek |
| 2,877,662 A | 3/1959 | Eduard |
| 2,897,016 A | 7/1959 | Baker |
| 2,947,609 A | 8/1960 | Strong |
| 2,947,610 A | 8/1960 | Hall et al. |
| 3,132,904 A | 5/1964 | Kohei et al. |
| 3,559,802 A | 2/1971 | Eidus |
| 3,582,161 A | 6/1971 | Hudson |
| 3,603,652 A | 9/1971 | Youden |
| 3,650,714 A | 3/1972 | Farkas |
| 3,697,141 A | 10/1972 | Garrett |
| 3,707,107 A | 12/1972 | Bier |
| 3,741,252 A | 6/1973 | Williams |
| 3,745,623 A | 7/1973 | Wentorf et al. |
| 3,752,541 A | 8/1973 | Mcvey |
| 3,866,987 A | 2/1975 | Garner |
| 3,869,947 A | 3/1975 | Vandenkieboom |
| 3,920,290 A | 11/1975 | Evarts |
| 4,085,634 A | 4/1978 | Sattler |
| 4,182,537 A | 1/1980 | Oster |
| 4,225,322 A | 9/1980 | Knemeyer |
| 4,238,137 A | 12/1980 | Furchak et al. |
| 4,285,550 A | 8/1981 | Blackburn et al. |
| 4,364,136 A | 12/1982 | Hattan |
| 4,382,637 A | 5/1983 | Blackburn et al. |
| 4,398,772 A | 8/1983 | Odell |
| 4,410,054 A | 10/1983 | Nagel et al. |
| 4,410,284 A | 10/1983 | Herrick |
| 4,428,627 A | 1/1984 | Teramachi |
| 4,432,682 A | 2/1984 | McKewan |
| 4,468,138 A | 8/1984 | Nagel |
| 4,554,208 A | 11/1985 | MacIver et al. |
| 4,560,014 A | 12/1985 | Geczy |
| 4,620,601 A | 11/1986 | Nagel |
| RE32,380 E | 3/1987 | Wentorf, Jr. et al. |
| 4,662,348 A | 5/1987 | Hall et al. |
| 4,679,639 A | 7/1987 | Barr et al. |
| 4,689,847 A | 9/1987 | Huber |
| 4,720,199 A | 1/1988 | Geczy et al. |
| 4,729,440 A | 3/1988 | Hall |
| 4,732,490 A | 3/1988 | Masciarelli |
| 4,738,322 A | 4/1988 | Hall et al. |
| 4,764,036 A | 8/1988 | McPherson |
| 4,796,670 A | 1/1989 | Russell et al. |
| 4,797,011 A | 1/1989 | Saeki et al. |
| 4,858,688 A | 8/1989 | Edwards et al. |
| 4,906,528 A | 3/1990 | Cerceau et al. |
| 4,958,692 A | 9/1990 | Anderson |
| 5,011,514 A | 4/1991 | Cho et al. |
| 5,011,515 A | 4/1991 | Frushour |
| 5,030,276 A | 7/1991 | Sung et al. |
| 5,037,212 A | 8/1991 | Justman et al. |
| 5,066,145 A | 11/1991 | Sibley et al. |
| 5,067,826 A | 11/1991 | Lemelson |
| 5,092,687 A | 3/1992 | Hall |
| 5,112,146 A | 5/1992 | Stangeland |
| 5,123,772 A | 6/1992 | Anderson |
| 5,151,107 A | 9/1992 | Cho et al. |
| 5,176,483 A | 1/1993 | Baumann et al. |
| 5,193,363 A | 3/1993 | Petty |
| 5,205,188 A | 4/1993 | Repenning et al. |
| 5,253,939 A | 10/1993 | Hall |
| 5,271,749 A | 12/1993 | Rai et al. |
| 5,351,770 A | 10/1994 | Cawthorne et al. |
| 5,358,041 A | 10/1994 | O'Hair |
| 5,358,337 A | 10/1994 | Codatto |
| 5,375,679 A | 12/1994 | Biehl |
| 5,385,715 A | 1/1995 | Fish |
| 5,447,208 A | 9/1995 | Lund et al. |
| 5,462,362 A | 10/1995 | Yuhta et al. |
| 5,464,086 A | 11/1995 | Coelln |
| 5,514,183 A | 5/1996 | Epstein et al. |
| 5,522,467 A | 6/1996 | Stevens et al. |
| 5,533,604 A | 7/1996 | Brierton |
| 5,538,346 A | 7/1996 | Frias et al. |
| 5,540,314 A | 7/1996 | Coelln |
| 5,560,716 A | 10/1996 | Tank et al. |
| 5,618,114 A | 4/1997 | Katahira |
| 5,645,617 A | 7/1997 | Frushour |
| 5,653,300 A | 8/1997 | Lund et al. |
| 5,715,898 A | 2/1998 | Anderson |
| 5,833,019 A | 11/1998 | Gynz-Rekowski |
| 5,855,996 A | 1/1999 | Corrigan et al. |
| 5,948,541 A | 9/1999 | Inspektor |
| 6,045,029 A | 4/2000 | Scott |
| 6,109,790 A | 8/2000 | Gynz-Rekowski et al. |
| 6,120,185 A | 9/2000 | Masciarelli |
| 6,129,195 A | 10/2000 | Matheny |
| 6,152,223 A | 11/2000 | Abdo et al. |
| 6,164,109 A | 12/2000 | Bartosch |
| 6,209,185 B1 | 4/2001 | Scott |
| 6,279,716 B1 | 8/2001 | Kayatani et al. |
| 6,378,633 B1 | 4/2002 | Moore et al. |
| 6,409,388 B1 | 6/2002 | Lin |
| 6,457,865 B1 | 10/2002 | Masciarelli, Jr. |
| 6,488,103 B1 | 12/2002 | Dennis et al. |
| 6,488,715 B1 | 12/2002 | Pope et al. |
| 6,516,934 B2 | 2/2003 | Masciarelli, Jr. |
| 6,517,583 B1 | 2/2003 | Pope et al. |
| 6,652,201 B2 | 11/2003 | Kunimori et al. |
| 6,655,845 B1 | 12/2003 | Pope et al. |
| 6,737,377 B1 | 5/2004 | Sumiya et al. |
| 6,764,219 B2 | 7/2004 | Doll et al. |
| 6,808,019 B1 | 10/2004 | Mabry |
| 6,814,775 B2 | 11/2004 | Scurlock et al. |
| 6,951,578 B1 | 10/2005 | Belnap et al. |
| 7,007,787 B2 | 3/2006 | Pallini et al. |
| 7,128,173 B2 | 10/2006 | Lin |
| 7,198,043 B1 | 4/2007 | Zhang |
| 7,234,541 B2 | 6/2007 | Scott et al. |
| 7,311,159 B2 | 12/2007 | Lin et al. |
| 7,441,610 B2 | 10/2008 | Belnap et al. |
| 7,475,744 B2 | 1/2009 | Pope |
| 7,552,782 B1 | 6/2009 | Sexton et al. |
| 7,703,982 B2 | 4/2010 | Cooley |
| 7,737,377 B1 | 6/2010 | Dodal et al. |
| 7,845,436 B2 | 12/2010 | Cooley et al. |
| 7,861,805 B2 | 1/2011 | Dick et al. |
| 7,870,913 B1 | 1/2011 | Sexton et al. |
| 8,069,933 B2 | 12/2011 | Sexton et al. |
| 8,080,071 B1 | 12/2011 | Vail |
| 8,109,247 B2 | 2/2012 | Wakade et al. |
| 8,119,240 B2 | 2/2012 | Cooper |
| 8,163,232 B2 | 4/2012 | Fang et al. |
| 8,277,124 B2 | 10/2012 | Sexton et al. |
| 8,277,722 B2 | 10/2012 | DiGiovanni |
| 8,365,846 B2 | 2/2013 | Dourfaye et al. |
| 8,480,304 B1 | 7/2013 | Cooley et al. |
| 8,485,284 B2 | 7/2013 | Sithebe |
| 8,613,554 B2 | 12/2013 | Tessier et al. |
| 8,627,904 B2 | 1/2014 | Voronin |
| 8,678,657 B1 | 3/2014 | Knuteson et al. |
| 8,701,797 B2 | 4/2014 | Baudoin |
| 8,734,550 B1 | 5/2014 | Sani |
| 8,757,299 B2 | 6/2014 | DiGiovanni et al. |
| 8,763,727 B1 | 7/2014 | Cooley et al. |
| 8,764,295 B2 | 7/2014 | Dadson et al. |
| 8,789,281 B1 | 7/2014 | Sexton et al. |
| 8,881,849 B2 | 11/2014 | Shen et al. |
| 8,911,521 B1 | 12/2014 | Miess et al. |

(56) References Cited

U.S. PATENT DOCUMENTS

| | | |
|---|---|---|
| 8,939,652 B2 | 1/2015 | Peterson et al. |
| 8,974,559 B2 | 3/2015 | Frushour |
| 9,004,198 B2 | 4/2015 | Kulkarni |
| 9,010,418 B2 | 4/2015 | Pereyra et al. |
| 9,045,941 B2 | 6/2015 | Chustz |
| 9,103,172 B1 | 8/2015 | Bertagnolli et al. |
| 9,127,713 B1 | 9/2015 | Lu |
| 9,145,743 B2 | 9/2015 | Shen et al. |
| 9,222,515 B2 | 12/2015 | Chang |
| 9,273,381 B2 | 3/2016 | Qian et al. |
| 9,284,980 B1 | 3/2016 | Miess |
| 9,309,923 B1 | 4/2016 | Lingwall et al. |
| 9,353,788 B1 | 5/2016 | Tulett et al. |
| 9,366,085 B2 | 6/2016 | Panahi |
| 9,404,310 B1 | 8/2016 | Sani et al. |
| 9,410,573 B1 | 8/2016 | Lu |
| 9,429,188 B2 | 8/2016 | Peterson et al. |
| 9,488,221 B2 | 11/2016 | Gonzalez |
| 9,562,562 B2 | 2/2017 | Peterson |
| 9,611,885 B1 * | 4/2017 | Cooley .................. F16C 17/02 |
| 9,643,293 B1 | 5/2017 | Miess et al. |
| 9,702,401 B2 | 7/2017 | Gonzalez |
| 9,732,791 B1 | 8/2017 | Gonzalez |
| 9,776,917 B2 | 10/2017 | Tessitore et al. |
| 9,790,749 B2 | 10/2017 | Chen |
| 9,790,818 B2 | 10/2017 | Berruet et al. |
| 9,803,432 B2 | 10/2017 | Wood et al. |
| 9,822,523 B1 | 11/2017 | Miess |
| 9,840,875 B2 | 12/2017 | Harvey et al. |
| 9,869,135 B1 | 1/2018 | Martin |
| 10,113,362 B2 | 10/2018 | Ritchie et al. |
| 10,294,986 B2 | 5/2019 | Gonzalez |
| 10,307,891 B2 | 6/2019 | Daniels et al. |
| 10,408,086 B1 | 9/2019 | Meier |
| 10,465,775 B1 | 11/2019 | Miess et al. |
| 10,683,895 B2 | 6/2020 | Hall et al. |
| 10,711,792 B2 | 7/2020 | Vidalenc et al. |
| 10,711,833 B2 | 7/2020 | Manwill et al. |
| 10,738,821 B2 | 8/2020 | Miess et al. |
| 10,807,913 B1 | 10/2020 | Hawks et al. |
| 10,968,700 B1 | 4/2021 | Raymond |
| 10,968,703 B2 | 4/2021 | Haugvaldstad et al. |
| 11,085,488 B2 | 8/2021 | Gonzalez |
| 11,286,985 B2 * | 3/2022 | Prevost .................. F16C 27/02 |
| 2002/0020526 A1 | 2/2002 | Male et al. |
| 2003/0019106 A1 | 1/2003 | Pope et al. |
| 2003/0075363 A1 | 4/2003 | Lin et al. |
| 2003/0159834 A1 | 8/2003 | Kirk et al. |
| 2003/0220691 A1 | 11/2003 | Songer et al. |
| 2004/0031625 A1 | 2/2004 | Lin et al. |
| 2004/0134687 A1 | 7/2004 | Radford et al. |
| 2004/0163822 A1 | 8/2004 | Zhang et al. |
| 2004/0219362 A1 | 11/2004 | Wort et al. |
| 2004/0223676 A1 | 11/2004 | Pope et al. |
| 2006/0060392 A1 | 3/2006 | Eyre |
| 2006/0165973 A1 | 7/2006 | Dumm et al. |
| 2007/0046119 A1 | 3/2007 | Cooley |
| 2008/0217063 A1 | 9/2008 | Moore et al. |
| 2008/0253706 A1 | 10/2008 | Bischof et al. |
| 2009/0020046 A1 | 1/2009 | Marcelli |
| 2009/0087563 A1 | 4/2009 | Voegele et al. |
| 2009/0268995 A1 | 10/2009 | Ide et al. |
| 2010/0037864 A1 | 2/2010 | Dutt et al. |
| 2010/0276200 A1 | 11/2010 | Schwefe et al. |
| 2010/0307069 A1 | 12/2010 | Bertagnolli et al. |
| 2011/0174547 A1 | 7/2011 | Sexton et al. |
| 2011/0203791 A1 | 8/2011 | Jin et al. |
| 2011/0220415 A1 | 9/2011 | Jin et al. |
| 2011/0297454 A1 | 12/2011 | Shen et al. |
| 2012/0037425 A1 | 2/2012 | Sexton et al. |
| 2012/0057814 A1 | 3/2012 | Dadson et al. |
| 2012/0225253 A1 | 9/2012 | DiGiovanni et al. |
| 2012/0281938 A1 | 11/2012 | Peterson et al. |
| 2013/0000442 A1 | 1/2013 | Wiesner et al. |
| 2013/0004106 A1 | 1/2013 | Wenzel |
| 2013/0146367 A1 | 6/2013 | Zhang et al. |
| 2013/0170778 A1 | 7/2013 | Higginbotham et al. |
| 2014/0037232 A1 | 2/2014 | Marchand et al. |
| 2014/0176139 A1 | 6/2014 | Espinosa et al. |
| 2014/0254967 A1 | 9/2014 | Gonzalez |
| 2014/0341487 A1 | 11/2014 | Cooley et al. |
| 2014/0355914 A1 | 12/2014 | Cooley et al. |
| 2015/0027713 A1 | 1/2015 | Penisson |
| 2015/0132539 A1 | 5/2015 | Bailey et al. |
| 2016/0153243 A1 | 6/2016 | Hinz et al. |
| 2016/0312535 A1 | 10/2016 | Ritchie et al. |
| 2017/0030393 A1 | 2/2017 | Phua et al. |
| 2017/0138224 A1 | 5/2017 | Henry et al. |
| 2017/0234071 A1 | 8/2017 | Spalz et al. |
| 2017/0261031 A1 | 9/2017 | Gonzalez et al. |
| 2018/0087134 A1 | 3/2018 | Chang et al. |
| 2018/0209476 A1 | 7/2018 | Gonzalez |
| 2018/0216661 A1 | 8/2018 | Gonzalez |
| 2018/0264614 A1 | 9/2018 | Winkelmann et al. |
| 2018/0320740 A1 | 11/2018 | Hall et al. |
| 2019/0063495 A1 | 2/2019 | Peterson et al. |
| 2019/0136628 A1 | 5/2019 | Savage et al. |
| 2019/0170186 A1 | 6/2019 | Gonzalez et al. |
| 2020/0031586 A1 | 1/2020 | Miess et al. |
| 2020/0032841 A1 | 1/2020 | Miess et al. |
| 2020/0032846 A1 | 1/2020 | Miess et al. |
| 2020/0056659 A1 | 2/2020 | Prevost et al. |
| 2020/0063498 A1 | 2/2020 | Prevost et al. |
| 2020/0063503 A1 | 2/2020 | Reese et al. |
| 2020/0182290 A1 | 6/2020 | Doehring et al. |
| 2020/0325933 A1 | 10/2020 | Prevost et al. |
| 2020/0362956 A1 | 11/2020 | Prevost et al. |
| 2021/0140277 A1 | 5/2021 | Hall et al. |
| 2021/0148406 A1 | 5/2021 | Hoyle et al. |
| 2021/0198949 A1 | 7/2021 | Haugvaldstad et al. |
| 2021/0207437 A1 | 7/2021 | Raymond |
| 2021/0222734 A1 | 7/2021 | Gonzalez et al. |

FOREIGN PATENT DOCUMENTS

| | | |
|---|---|---|
| JP | S6061404 A | 4/1985 |
| JP | 2004002912 A | 1/2004 |
| JP | 2008056735 A | 3/2008 |
| WO | 8700080 A1 | 1/1987 |
| WO | 2004001238 A2 | 12/2003 |
| WO | 2006011028 A1 | 2/2006 |
| WO | 2013043917 A1 | 3/2013 |
| WO | 2014014673 A1 | 1/2014 |
| WO | 2014189763 A1 | 11/2014 |
| WO | 2016089680 A1 | 6/2016 |
| WO | 2017105883 A1 | 6/2017 |
| WO | 2018041578 A1 | 3/2018 |
| WO | 2018226380 A1 | 12/2018 |
| WO | 2019096851 A1 | 5/2019 |

OTHER PUBLICATIONS

Chen, Y.; Nguyen, T; Zhang, L.C.; Polishing of polycrystalline diamond by the technique of dynamic friction—Part 5: Quantitative analysis of material removal, International Journal of Machine Tools & Manufacture, 2009, pp. 515-520, vol. 49, Elsevier.

Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine fools & Manufacture, 2006, pp. 580-587, vol. 46, Elsevier.

Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.

Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.

(56) References Cited

OTHER PUBLICATIONS

Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.

Dobrzhinetskaya, Larissa F.; Green, II, Harry W.; Diamond Synthesis from Graphite in the Presence of Water and SiO2: Implications for Diamond Formation in Quartzites from Kazakhstan, International Geology Review, 2007, pp. 389-400, vol. 49.

Element six, The Element Six CVD Diamond Handbook, Accessed on Nov. 1, 2019, 28 pages.

Grossman, David, What the World Needs Now is Superhard Carbon, Popular Mechanics, https://www.popularmechanics.com/science/environment/a28970718/superhard-materials/,Sep. 10, 2019, 7 pages, Hearst Magazine Media, Inc.

Liao, Y.; Marks, L.; In situ single asperity wear at the nanometre scale, International Materials Reviews, 2016, pp. 1-17, Taylor & Francis.

Linear Rolling Bearings ME EN 7960—Precision Machine Design Topic 8, Presentation, Accessed on Jan. 26, 2020, 23 Pages, University of Utah.

Machinery's Handbook 30th Edition, Copyright Page and Coefficients of Friction Page, 2016, p. 158 (2 Pages total) Industrial Press, Inc, South Norwalk, U.S.A.

Machinery's Handbook, 2016, Industrial Press, Inc., 30th edition, pp. 843 and 1055 (6 pages total).

McCarthy, J. Michael; Cam and Follower Systems, PowerPoint Presentation, Jul. 25, 2009, pp. 1-14, UCIrvine The Henry Samueli School of Engineering.

McGill Cam Follower Bearings brochure, 2005, p. 1-19, Back Page, Brochure MCCF-05, Form #8991 (20 Pages total).

Motion & Control NSK Cam Followers (Stud Type Track Rollers) Roller Followers (Yoke Type Track Rollers) catalog, 1991, Cover Page, pp. 1-18, Back Page, Cat No. E1421 2004 C-11, Japan.

Product Catalogue, Asahi Diamond Industrial Australia Pty. Ltd., accessed on Jun. 23, 2018, Cover Page, Blank Page, 2 Notes Pages, Table of Contents, pp. 1-49 (54 Pages total).

RBC Aerospace Bearings Rolling Element Bearings catalog, 2008, Cover Page, First Page, pp. 1-149, Back Page (152 Pages total).

RGPBalls Ball Transfer Units catalog, accessed on Jun. 23, 2018, pp. 1-26, 2 Back Pages (28 Pages total).

Sandvik Coromant Hard part turning with CBN catalog, 2012, pp. 1-42, 2 Back Pages (44 Pages total).

Sexton, Timothy N.; Cooley, Craig H.; Diamond Bearing Technology for Deep and Geothermal Drilling, PowerPoint Presentation, 2010, 16 Pages.

SKF Ball transfer units catalog, Dec. 2006, Cover Page, Table of Contents, pp. 1-36, 2 Back Pages (40 Pages total), Publication 940-711.

Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).

Sun, Liling; Wu, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.

Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.

Surface Finish, Wikipedia, https://en.wikipedia.org/wiki/Surface_finish, Retrieved from https://en.wikipedia.org/w/index.php?title=Surface_finish&oldid=919232937, Oct. 2, 2019, 3 pages.

United States Defensive Publication No. T102,901, published Apr. 5, 1983, in U.S. Application No. 298,271 [2 Pages].

USSynthetic Bearings and Waukesha Bearings brochure for Diamond Tilting Pad Thrust Bearings, 2015, 2 Pages.

USSynthetic Bearings brochure, accessed on Jun. 23, 2018, 12 Pages, Orem, Utah.

Zeidan, Fouad Y.; Paquette, Donald J., Application of High Speed and High Performance Fluid Film Bearings in Rotating Machinery, 1994, pp. 209-234.

Zhigadlo, N. D., Spontaneous growth of diamond from MnNi solvent-catalyst using opposed anvil-type high-pressure apparatus, accessed on Jun. 28, 2018, pp. 1-12, Laboratory for Solid State Physics, Switzerland.

Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.

\* cited by examiner

POLYCRYSTALLINE DIAMOND BEARINGS FOR ROTATING MACHINERY WITH COMPLIANCE

CROSS-REFERENCE TO RELATED APPLICATIONS

The present application is a Continuation of the U.S. patent application Ser. No. 16/812,016, filed on Mar. 6, 2020 (now allowed), which is a Continuation-in-Part of U.S. patent application Ser. No. 16/049,608 (now U.S. Pat. No. 10,738,821), entitled "Polycrystalline Diamond Radial Bearing", filed on Jul. 30, 2018, which is incorporated herein by reference in its entirety as if set out in full, and also claims the benefit of U.S. Provisional Patent Application No. 62/845,131, entitled "Threaded Positioning Mechanism", filed on May 8, 2019, which is incorporated herein by reference in its entirety as if set out in full.

FIELD

The present disclosure relates to polycrystalline diamond bearing elements having compliance for use in bearing applications in rotating machinery, including for use in industrial applications, such as turbines, pumps, compressors, generators, combustion engines, drilling tools, and other tools including downhole tools; to systems including the same; and to methods of making and using the same.

BACKGROUND

Radial bearings are used in tools, rotating machinery, and components to bear load. One application of radial bearings is in rotating machinery. In rotating machinery, typically one part, a rotor, is positioned relative to and movably coupled with another part, a stator, such that the rotor moves (e.g., rotates) relative to the stator. Bearings can be used to facilitate the movable coupling between the rotor and stator. Such bearings can be positioned between the stator (e.g., a bearing housing) and the rotor (e.g., a drive shaft) to allow rotation of the rotor while the stator remains generally stationary. For example, such rotating machinery may be positioned within a wellbore and may rotate with a drill string.

In some applications, at low speeds, where the rotor (e.g., drive shaft) is moving at relatively low speeds and/or high loads relative to the stator (e.g., the bearing housing), the surfaces of the bearing elements are directly in contact (i.e., boundary lubrication) with the opposing bearing surfaces, whereas, at high-speeds and/or low loads, where the rotor is moving at relatively high speeds relative to the stator, a fluid film may develop (i.e., hydrodynamic lubrication) between bearing elements and opposing bearing surfaces such that the surfaces of the bearing elements are not directly in contact with the opposing bearing surfaces, but are engaged therewith through the fluid film. In such applications, the selective provision of a space between the bearing elements and opposing bearing surfaces when operating at high speeds provides for the development of and maintenance of such fluid films when needed.

Also, when polycrystalline diamond bearing elements are used as radial bearings in rotating machinery, typically both the bearing engagement surface and the opposing bearing engagement surface are composed of polycrystalline diamond. This is, at least in part, because thermally stable polycrystalline diamond (TSP), either supported or unsupported by tungsten carbide, and polycrystalline diamond compact (PDC or PCD) have been considered as contraindicated for use in the machining of diamond reactive materials, for example. Diamond reactive materials include metals, metal alloys, composites, hardfacings, coatings, or platings that contain more than trace amounts of diamond catalyst or solvent elements (also referred to as diamond solvent-catalysts or diamond catalyst-solvents) including iron, cobalt, nickel, ruthenium, rhodium, palladium, chromium, manganese, copper, titanium, or tantalum. Further, this prior contraindication of the use of polycrystalline diamond extends to so called "superalloys", including iron-based, cobalt-based and nickel-based superalloys containing more than trace amounts of diamond catalyst or solvent elements. The surface speeds typically used in machining of such materials typically ranges from about 0.2 m/s to about 5 m/s when using sintered tungsten carbide cutting tools. Although these surface speeds are not particularly high, the load and attendant temperature generated, such as at a cutting tip, often exceeds the graphitization temperature of diamond (i.e., about 700° C. or about 973 K), which can, in the presence of diamond catalyst or solvent elements, lead to rapid wear and failure of components. Without being bound by theory, the specific failure mechanism is believed to result from the chemical interaction of the carbon bearing diamond with the carbon attracting material that is being machined. An exemplary reference concerning the contraindication of polycrystalline diamond for diamond catalyst or solvent containing metal or alloy machining is U.S. Pat. No. 3,745,623. The contraindication of polycrystalline diamond for machining diamond catalyst or diamond solvent containing materials has long caused the avoidance of the use of polycrystalline diamond in all contacting applications with such materials.

BRIEF SUMMARY

Some embodiments of the present disclosure include a rotating machine. The rotating machine includes a stator, and a rotor movably coupled with the stator. The rotor has a first opposing bearing engagement surface that comprises a material that contains from 2 to 100 weight percent of a diamond solvent-catalyst, based on a total weight of the material. A compliant bearing assembly is positioned between the rotor and the stator, and interfaces engagement between the rotor and the stator. The compliant bearing assembly includes a first bearing ring having a first plurality of polycrystalline diamond bearing elements, each having a first bearing engagement surface that is engaged with the first opposing engagement surface. The compliant bearing assembly includes a spring coupled with the first bearing ring and positioned on the first bearing ring such that a distance between the first bearing engagement surfaces are the first opposing engagement surface is variable.

Another embodiment of the present disclosure includes a rotating machine. The rotating machine includes a stator and a rotor movably coupled with the stator. The rotor has a first opposing bearing engagement surface that includes a material that contains from 2 to 100 weight percent of a diamond solvent-catalyst, based on a total weight of the material. A bearing assembly is positioned between the rotor and the stator. The bearing assembly interfaces engagement between the rotor and the stator. The bearing assembly includes a first bearing ring having a first plurality of polycrystalline diamond bearing elements on an inner surface thereof, each with a first bearing engagement surface that is engaged with the first opposing engagement surface. The bearing assembly includes a second bearing ring having a second plurality of polycrystalline diamond bearing elements, each having a second bearing engagement surface. The second bearing engagement surfaces are engaged with an outer surface of the first bearing ring. The first and second bearing rings are arranged in a nested configuration between the stator and the rotor such that the second bearing ring is positioned between the first bearing ring and the stator and the first bearing ring is positioned between the second bearing ring and the rotor.

Another embodiment of the present disclosure includes a rotating machine that includes a bearing housing having an outer surface and an inner surface, with the inner surface defining an annulus. A rotor is movably coupled within the annulus of the bearing housing. The rotor has an opposing engagement surface that includes a material that contains from 2 to 100 weight percent of a diamond solvent-catalyst, based on a total weight of the material. A plurality of sockets are in the bearing housing, and a plurality of polycrystalline diamond bearing elements are coupled with the sockets. Each polycrystalline diamond bearing element has a bearing engagement surface that is engaged with the opposing engagement surface. The polycrystalline diamond bearing elements are capable of tilting relative to the outer surface of the bearing housing.

Another embodiment of the present disclosure includes a method of bearing load in a rotating machine. The method includes providing a bearing housing having a first bearing ring including a first plurality of polycrystalline diamond bearing elements, each having a first bearing engagement surface. The bearing housing has an outer surface and an inner surface defining an annulus. The method includes providing a rotor that is movably coupled with a stator, the rotor having an opposing engagement surface that includes a material that contains from 2 to 100 weight percent of a diamond solvent-catalyst, based on a total weight of the material. The method includes positioning the bearing housing between the rotor and the stator to interface engagement between the rotor and the stator. The first bearing engagement surfaces are engaged with the opposing engagement surface. The method includes providing the polycrystalline diamond bearing elements with compliance such that a distance between the first bearing engagement surfaces and the opposing engagement surface is variable in response to load and surface speed.

Another embodiment of the present disclosure includes a method of bearing load in a rotating machine. The method includes providing a first bearing ring having a first plurality of polycrystalline diamond bearing elements, each having a first bearing engagement surface. The method includes providing a second bearing ring having a second plurality of polycrystalline diamond bearing elements, each having a second bearing engagement surface. The method includes providing a rotor that is movably coupled with a stator, the rotor having an opposing engagement surface that includes a material that contains from 2 to 100 weight percent of a diamond solvent-catalyst, based on a total weight of the material. The method includes positioning the first bearing ring between the rotor and the stator, with the first bearing engagement surfaces engaged with the opposing engagement surface. The method includes positioning the second bearing ring between the stator and the first bearing ring, with the second bearing engagement surfaces engaged with an outer surface of the first bearing ring The first and second bearing rings are arranged in a nested configuration.

Another embodiment of the present disclosure includes a bearing assembly for use in rotating machines. The bearing assembly includes a first bearing ring having a first plurality of polycrystalline diamond bearing elements on an inner surface thereof, each having a first bearing engagement surface that is engaged with the first opposing engagement surface. The bearing assembly includes a spring coupled with the first bearing ring and positioned on the first bearing ring such that a position of the first bearing engagement surfaces is variable.

Another embodiment of the present disclosure includes a bearing assembly for use in rotating machinery. The bearing assembly includes a first bearing ring including a first plurality of polycrystalline diamond bearing elements on an inner surface thereof. The bearing assembly has a second bearing ring having a second plurality of polycrystalline diamond bearing elements having second bearing engagement surfaces, with the second bearing engagement surfaces engaged with an outer surface of the first bearing ring. The first and second bearing rings are arranged in a nested configuration.

Another embodiment of the present disclosure includes a bearing assembly for use in rotating machines. The bearing assembly includes a bearing housing having an outer surface and an inner surface, the inner surface defining an annulus. A plurality of sockets are in the bearing housing, and a plurality of polycrystalline diamond bearing elements are coupled with the sockets. Each polycrystalline diamond bearing element has a bearing engagement surface that is engaged with the opposing engagement surface. The polycrystalline diamond bearing elements are capable of tilting relative to the outer surface of the bearing housing.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

Figure 1:
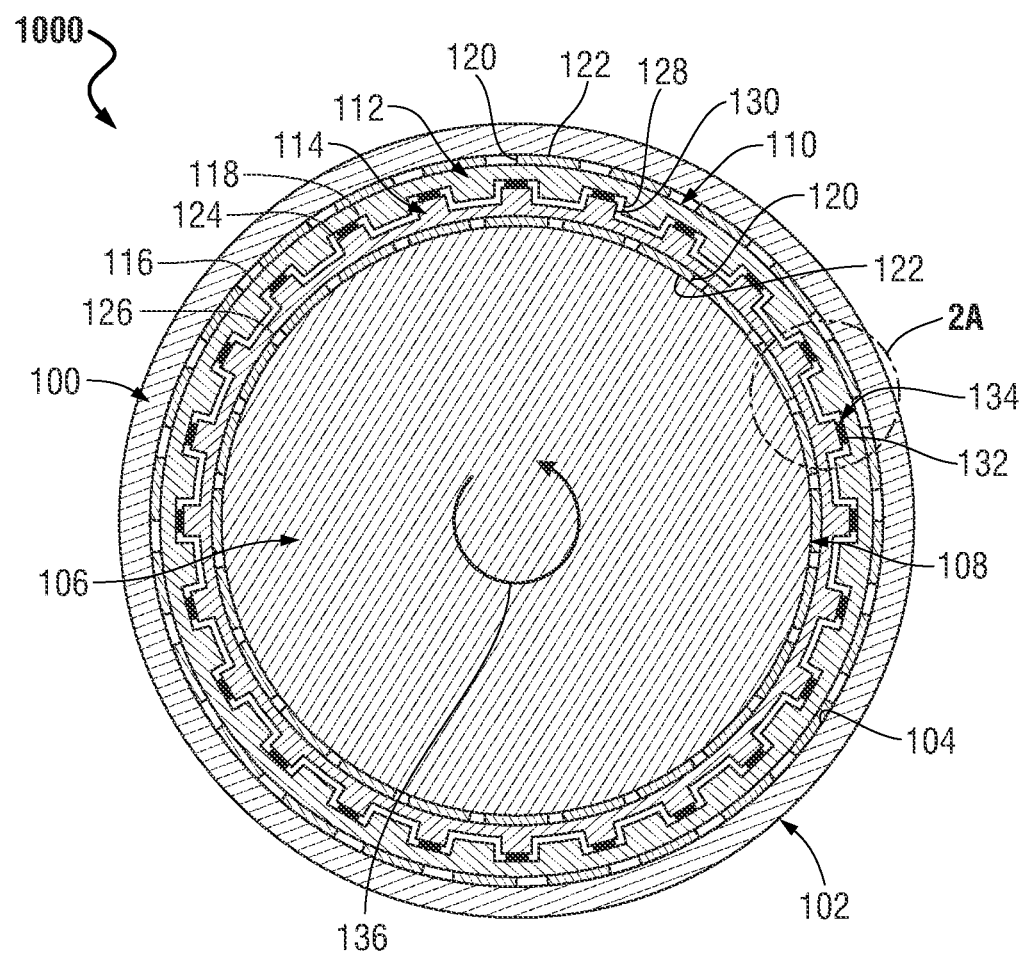
FIG. 1 is a lateral, cross-sectional view of a portion of a bearing assembly for rotating machinery in accordance with some embodiments.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain embodiments of the present disclosure include methods and apparatus for providing compliance to polycrystalline diamond bearing elements. The present disclosure includes polycrystalline diamond bearing elements, bearing rings, and bearing mounts that have or provide compliance; systems and rotating machinery and components thereof having such polycrystalline diamond bearings, bearing rings, and bearing mounts; and methods of making and using the same. The bearing assemblies disclosed herein may be used in rotating machinery (including turbomachinery), such as motors and turbines. When used in motors, the motors may be, but are not limited to, drilling motors for downhole drilling, including directional drilling, such as mud motors. The bearing assemblies disclosed herein may be used in apparatus including, but not limited to, gearboxes, turbines, pumps, compressors, mining equipment, drilling equipment, construction equipment, combustion engines, windmills, automotive parts, and aircraft parts.

Certain embodiments include drive shafts having polycrystalline diamond bearings (e.g., radial bearings) thereon. For convenience, certain parts of the following descriptions disclose a stator component and a rotor component. However, it would be understood by one skilled in the technology disclosed herein may be applied to various parts that are movably engaged, such as to a drive shaft movably coupled within a housing. Also, for convenience, certain parts of the following descriptions present an outer stator component and an inner rotor component. However, it would be understood by one skilled in the art that the inner component may be held static and the outer component may be rotated. Additionally, it would be understood by one skilled in the art that, although the descriptions of the disclosure are directed to rotor and stator configurations, the technology disclosed herein is not limited to such applications and may be applied in various other applications including discrete bearings with an inner and outer race where the outer and inner races both rotate or where either one or the other of the outer and inner races is held stationary. While the disclosure describes methods, systems, and apparatus for providing compliance in radial bearings, such as in rotating machinery, the methods, systems, and apparatus for providing compliance disclosed herein are not limited to use in radial bearings, and may include thrust bearings, radial bearings, combined thrust/radial bearings, or other bearing apparatuses including bearing surfaces that move in relation to one another. For example, the methods, systems, and apparatus for providing compliance to polycrystalline diamond bearing elements disclosed herein may be used in: the drilling tools of U.S. patent application Ser. No. 16/561,335 (the '335 Application); the radial bearings disclosed in U.S. patent application Ser. No. 16/049,608 (the '608 Application); the thrust bearings disclosed in U.S. patent application Ser. No. 16/049,617 (the '617 Application); the bearings of the roller ball assembly disclosed in U.S. patent application Ser. No. 16/049,631 (the '631 Application); and the bearings of the tubular assemblies disclosed in U.S. patent application Ser. No. 16/529,310 (the '310 Application). Each of the '617 Application, the '631 Application, and the '310 Application are incorporated herein by reference in their entireties as if set out in full. Furthermore, the methods, systems, and apparatus for providing compliance to polycrystalline diamond bearing elements disclosed herein may be used in the bearing engagements disclosed in U.S. patent application Ser. No. 16/425,758 (the '758 Application), where the opposing bearing surface that engages with the bearing surface of the polycrystalline diamond bearing element is a treated surface. The entirety of the '758 Application is incorporated herein by reference in its entirety as if set out in full. Furthermore, while the methods, systems, and apparatus for providing compliance to polycrystalline diamond bearing elements disclosed herein are described in reference to downhole rotating machinery, the methods, systems, and apparatus disclosed herein are not limited to such applications and may be used in other oil and gas components (e.g., surface components) or used in applications other than oil and gas applications.

As used herein, a "diamond reactive material" is a material that contains more than trace amounts of diamond catalyst or diamond solvent, which are also referred to as "diamond catalyst-solvent,", "catalyst-solvent," "diamond solvent-catalyst," or "solvent-catalyst." Some examples of known solvent-catalysts are disclosed in: U.S. Pat. Nos. 3,745,623; 7,198,043; 8,627,904; 5,385,715; 8,485,284; 6,814,775; 5,271,749; 5,948,541; 4,906,528; 7,737,377; 5,011,515; 3,650,714; 2,947,609; and 8,764,295. As used herein, a diamond reactive material that contains more than "trace amounts" of diamond catalyst or diamond solvent, is a material that contains at least 2 percent by weight (wt. %) diamond catalyst or diamond solvent. In some aspects, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond catalyst or diamond solvent. As would be understood by one skilled in the art, diamond solvent-catalysts are chemical elements, compounds, or materials (e.g., metals) that are capable of reacting with polycrystalline diamond (e.g., catalyzing and/or solubilizing), resulting in the graphitization of the polycrystalline diamond, such as under load and at a temperature at or exceeding the graphitization temperature of diamond (i.e., about 700° C. or about 973 K). Thus, diamond reactive materials include materials that, under load and at a temperature at or exceeding the graphitization temperature of diamond, can lead to wear, sometimes rapid wear, and failure of components formed of or including polycrystalline diamond, such as diamond tipped tools. Diamond reactive materials include, but are not limited to, metals, metal alloys, and composite materials that contain more than trace amounts of diamond solvent-catalysts. In some aspects, the diamond reactive materials are in the form of hardfacings, coatings, or platings. Some exemplary diamond solvent-catalysts include iron, cobalt, nickel, ruthenium, rhodium, palladium, chromium, manganese, copper, titanium, tantalum, and alloys thereof. Thus, a diamond reactive material may be a material that includes more than trace amounts of iron, cobalt, nickel, ruthenium, rhodium, palladium, chromium, manganese, copper, titanium, tantalum, or alloys thereof. One exemplary diamond reactive material is steel. In some aspects, the diamond reactive material is a superalloy including, but not limited to, an iron-based superalloy, a cobalt-based superalloy, or a nickel-based superalloy. In certain aspects, the diamond reactive material is not and/or does not include (i.e., specifically excludes) so called "superhard materials." As would be understood by one skilled in the art, "superhard materials" are a category of materials defined by the hardness of the material, which may be determined in accordance with the Brinell, Rockwell, Knoop and/or Vickers scales. For example, superhard materials include materials with a hardness value exceeding 40 gigapascals (GPa) when measured by the Vickers hardness test. As used herein, "superhard materials" are materials that are at least as hard as tungsten carbide, including tungsten carbide tiles and cemented tungsten carbide, such as is determined in accordance with one of these hardness scales. One skilled in the art would understand that a Brinell scale test may be performed, for example, in accordance with ASTM E10-18; the Vickers hardness test may be performed, for example, in accordance with ASTM E92-17; the Rockwell hardness test may be performed, for example, in accordance with ASTM E18; and the Knoop hardness test may be performed, for example, in accordance with ASTM E384-17. The "superhard materials" disclosed herein include, but are not limited to, tungsten carbide (e.g., tile or cemented), infiltrated tungsten carbide matrix, silicon carbide, silicon nitride, cubic boron nitride, and polycrystalline diamond. Thus, in some aspects, the "diamond reactive material" is partially or entirely composed of material(s) (e.g., metal, metal alloy, composite) that is softer (less hard) than superhard materials, such as less hard than tungsten carbide (e.g., tile or cemented), as determined in accordance with one of these hardness tests, such as the Brinell scale.

In some aspects, the present disclosure provides for interfacing the engagement between a rotor and stator with a polycrystalline diamond bearing element in contact with a diamond reactive material. For example, the polycrystalline diamond bearing element may be positioned and arranged on the stator for sliding contact with the rotor, where the rotor is formed of or includes at least some diamond reactive material. Alternatively, the polycrystalline diamond bearing element may be positioned and arranged on the rotor for sliding contact with the stator, where the stator is formed of or includes at least some diamond reactive material. Alternatively, the polycrystalline diamond bearing element may be positioned and arranged on a bearing ring between the rotor and the stator for sliding contact with the rotor and stator, where the rotor and stator are formed of or include at least some diamond reactive material. The polycrystalline diamond bearing element may have an engagement surface for engagement with an opposing engagement surface of the diamond reactive material. As used herein, "engagement surface" refers to the surface of a material or component (e.g., polycrystalline diamond or diamond reactive materials) that is positioned and arranged within a bearing assembly such that, in operation of the bearing assembly, the engagement surface interfaces the contact between two components (e.g., between the stator and the rotor). The "engagement surface" may also be referred to herein as the "bearing surface."

In certain applications, the polycrystalline diamond bearing element, or at least the engagement surface thereof, is lapped or polished, optionally highly lapped or highly polished. Although highly polished polycrystalline diamond bearing elements are used in at least some applications, the scope of this disclosure is not limited to highly polished polycrystalline diamond bearing elements and includes polycrystalline diamond bearing elements that are highly lapped or polished. As used herein, a surface is defined as "highly lapped" if the surface has a surface finish of 20 μin (0.51 microns) or about 20 μin (0.51 microns), such as a surface finish ranging from about 18 (0.46 microns) to about 22 μin (0.56 microns). As used herein, a surface is defined as "polished" if the surface has a surface finish of less than about 10 μin (0.25 microns), or of from about 2 μin (0.05 microns) to about 10 μin (0.25 microns). As used herein, a surface is defined as "highly polished" if the surface has a surface finish of less than about 2 μin (0.05 microns), or from about 0.5 μin (0.01 microns) to less than about 2 μin (0.05 microns). In some aspects, the polycrystalline diamond engagement surfaces disclosed herein have a surface finish ranging from 0.5 μin (0.01 microns) to 40 μin (1.0 microns), or from 2 On (0.05 microns) to 30 μin (0.76 microns), or from 5 μin (0.01 microns) to 20 μin (0.51 microns), or from 8 μin (0.2 microns) to 15 μin (0.38 microns), or less than 20 μin (0.51 microns), or less than 10 μin (0.25 microns), or less than 2 μin (0.05 microns), or any range therebetween. Without being bound by theory, it is believed that polycrystalline diamond that has been polished to a surface finish of 0.5 μin (0.01 microns) has a coefficient of friction that is about half of standard lapped polycrystalline diamond with a surface finish of 20-40 μin (0.51-1.0 microns). U.S. Pat. Nos. 5,447,208 and 5,653,300 to Lund et al., the entireties of which are incorporated herein by reference, provide disclosure relevant to polishing of polycrystalline diamond. As would be understood by one skilled in the art, surface finish, also referred to as surface texture or surface topography, is a characteristic of a surface as defined by lay, surface roughness, and waviness. Surface finish may be determined in accordance with ASME B46.1-2009. Surface finish may be measured with a profilometer, laser microscope, or with Atomic Force Microscopy, for example.

In some embodiments, the bearing assemblies disclosed herein are capable of operating in at least two states, including a first state in which the bearing surfaces of the bearing assembly are in direct sliding contact with one another and little to no fluid film is present between the bearing surfaces of the bearing assembly; and a second state in which a fluid film is positioned between the bearing surfaces of the bearing assembly and the bearing surfaces of the bearing assembly are not in direct contact with one another. As would be understood by one skilled in the art, a "fluid film bearing" (also referred to as a "fluid bearing") is a bearing in which load is supported by a layer of moving, pressurized liquid or gas that is positioned between the bearing surfaces of the bearing assembly. When a fluid film bearing is sufficiently present, there is no contact between the opposing bearing surfaces, and there is no contact between the moving parts (i.e., between the stator and rotor).

At some operational conditions, a fluid film bearing is formed between the bearing surfaces of the components of the rotating machine. One skilled in the art would understand that the particular operational conditions under which a fluid film bearing is formed will vary depending upon the particular rotating machine and the particular application thereof. Parameters that affect the development of a fluid film bearing include, but are not limited to, surface speed and bearing load. As used herein, the "surface speed" is the relative velocity between the rotor and the stator of the rotating machine. As used herein, the "bearing load" is the load on the bearing assembly of the rotating machine. The rotating machines disclosed herein may develop fluid film bearings between the bearing surfaces thereof under "high-load/low speed" operational conditions, and under "low-load/high speed" operational conditions. For example, at a relatively low bearing load of "Y" in a particular bearing assembly of a particular rotating machine, a fluid film bearing may develop only at or above a relatively high surface speed of "Z". Whereas, for the same bearing assembly and same rotating machine, a fluid film bearing may develop at a relatively high load of "Y$^+$" even at a relatively low surface speed of "Z$^-$". In these examples, Y$^+$ is greater than Y, and Z$^-$ is less than Z.

One exemplary operational condition in which a rotating machine might operate in a state in which no fluid film is between the bearing surfaces of the bearing assembly such that the bearing surfaces are in direct sliding contact with one another is during "start-up" of a rotating machine. As used herein, "start-up" refers to an operational state of a rotating machine wherein movement (e.g., rotation) of one component (e.g., a drive shaft or other rotor) in the rotating machine is initiated, and including subsequent acceleration and movement of that one component under load conditions and at a surface speed relative to the other component where there is no fluid film bearing developed between the bearing surfaces of the components of the rotating machine. Another exemplary operational condition in which a rotating machine might operate in a state in which no fluid film is between the bearing surfaces of the bearing assembly such that the bearing surfaces are in direct sliding contact with one another is during "shut-down". As used herein, "shut-down" refers to an operational state of a rotating machine wherein the rotating machine was previously operating with a fluid film bearing but has transitioned to operating without a fluid film bearing, with the bearing surfaces in direct sliding contact. For example, at a set load, the surface speed may be reduced from a surface speed wherein a fluid film is developed between the bearing surfaces to a lower surface speed wherein no fluid film is developed; or, alternatively, at a set surface speed, the load on the bearing may be reduced from a load wherein a fluid film is developed between the bearing surfaces to a lower load wherein no fluid film is developed. For example, "start-up" may include initiation of and acceleration of movement of the rotating machine from a prior state of non-movement up to a state where a fluid film is developed, and "shut-down" may include the deceleration of the movement of the rotation machine from a state where a fluid film is developed to a state where no fluid film is developed and the continued deceleration of the rotating machine until the movement of the rotating machine has ceased.

As used herein "engaged" or "engage", in reference to surfaces, refers to surfaces that are in contact with one another both directly (i.e., direct contact) and surfaces that are coupled with a fluid film between the surfaces where the surfaces are not in direct contact. As used herein, "direct contact", in reference to surfaces, refers to surfaces that are physically touching one another without any intermediate medium interfacing the contact between the surfaces (e.g., without a fluid film interfacing the contact).

As used herein, "compliance," in relation to a bearing element, refers to the ability of the bearing element to elastically move in response to load. For example, the bearing element may have a magnitude of elastic variation in the orientation, position, or both the orientation and position in response to load. For example, the bearing element may be mounted in a manner that allows for variation in the orientation, position, or orientation and position of the bearing engagement surface of the bearing element. Such variation may be referred herein as "compliance" or "compliant," i.e., the ability of the mounting structure of the bearing element to elastically deform or otherwise allow or accommodate variations in orientation and/or position when a force is applied to the bearing engagement surface of the bearing element. The compliance of the bearing elements disclosed herein may provide for the development of fluid films between the bearing engagement surface and an opposing engagement surface. The compliance of the bearing elements disclosed herein may provide the bearing elements with the ability to adjust in response to loads, including non-uniform loads and misalignment between moving parts (e.g., rotors and stators).

While the bearing assemblies are described in reference to specific embodiment herein, the bearing assemblies disclosed herein are not limited to the specific applications described, and may be used in rotating machinery where fluid film lubrication and/or tilting bearing pads facilitate the development of a fluid film and where compliance facilitates the ability to reduce and vibration in the rotating machinery.

While the present disclosure describes compliant bearing assemblies provided in bearing rings that are positioned between a rotor and stator, the compliant bearings may be provided directly on the rotor, the stator, or combinations thereof. In some embodiments, where an engagement surface is slidingly engaged with an opposing engagement surface, one or both of the engagement surface and opposing engagement surface is provided with compliant bearings in accordance with the present disclosure.

Throughout the present disclosure, like references numerals are used to refer to like elements. For example, in FIG. 1 a "drive shaft" is identified as numeral "106", whereas, in FIG. 3 a "drive shaft" is identified as numeral "306". With reference to FIG. 1, rotating machine 1000 is depicted. Rotating machine 1000 may be a downhole tool, such as a downhole motor or tool, for use in downhole oil and gas exploration, drilling, and production operations. For example, and without limitation, rotating machine 1000 may be a mud motor or drilling motor or a pump. Rotating machine 1000 includes a stator component and a rotor component. In the embodiment of FIG. 1, the stator component is outer housing 100. Outer housing 100 may be a portion of a drill string, such as a bearing housing or motor housing, or another component of a drill string. Outer housing 100 includes outer surface 102 and inner surface 104.

In the embodiment of FIG. 1, the rotor component is drive shaft 106. Drive shaft 106 is positioned within the annulus defined by the inner surface 104 of outer housing 100. While drive shaft 106 is shown as a solid structure, the drive shafts and other rotors disclosed herein are not limited to being solid structures, and may be hollow or at least partially hollow structures. Drive shaft 106 includes outer surface 108.

Rotating machine 1000 includes bearing assembly 110 interfacing engagement between drive shaft 106 and outer housing 100. Bearing assembly 110 includes outer bearing ring 112 and inner bearing ring 114. Outer bearing ring 112 includes outer surface 116 and inner surface 118. A plurality of polycrystalline diamond bearing elements 120 are coupled with outer bearing ring 112. Each polycrystalline diamond bearing element 120 includes a bearing engagement surface 122. Each polycrystalline diamond bearing element 120 on outer bearing ring 112 extends from outer surface 116 of outer bearing ring 112 and towards inner surface 104 of outer housing 100. Inner bearing ring 114 includes outer surface 124 and inner surface 126. A plurality of polycrystalline diamond bearing elements 120 are coupled with inner bearing ring 114. Each polycrystalline diamond bearing element 120 includes a bearing engagement surface 122. Each polycrystalline diamond bearing element 120 on inner bearing ring 114 extends from inner surface 126 of inner bearing ring 114 and towards outer surface 108 of drive shaft 106. Thus, one plurality of polycrystalline diamond bearing elements 120 may be coupled with and extend, intermittently, about the entire inner circumference of inner bearing ring 114, and another plurality of polycrystalline diamond bearing elements 120 may be coupled with and extend, intermittently, about the entire outer circumference of outer bearing ring 112.

Inner surface 118 of outer bearing ring 112 has a surface that is shaped to mate with the shape of outer surface 124 of inner bearing ring 114. For example, as shown in FIG. 1, surface 118 is shaped to define gear teeth 128 and surface 124 is shaped to define gear teach 130, and outer bearing ring 112 and inner bearing ring 114 are coupled such that the gear teeth 128 and 130 mesh with one another, allowing for the transfer of torque from one bearing ring to the other. The coupling of the inner and outer bearing rings disclosed herein is not limited to the use of gear-teeth-shaped surfaces, as is shown in FIG. 1, and may use other coupling mechanisms for the transfer of torque from one of the bearing rings to the other.

Bearing assembly 110 includes one or more biasing or compliance mechanisms, here shown as springs 132 coupled with surfaces 124 and 118. Springs 132 bias bearing rings 112 and 114 into a position where bearing rings 112 and 114 are spaced-apart from one another, such that cavity 134 is formed between bearing rings 112 and 114. While shown as springs, the biasing mechanisms (also referred to as a "compliance members") disclosed herein are not limited to springs and may be or include other structures capable biasing the bearing rings into a spaced-apart relationship. For example, the springs disclosed herein may be replaced with an elastic material, such as rubber that compresses when under sufficient forces (e.g., load, surface speed, fluid pressure) and elastically decompresses when conditions are no longer sufficient to compress the rubber. In some embodiments, the spring disclosed herein may be replaced with a solid elastically compressible material. For example, under certain operating conditions (e.g., certain loads and surface speeds), relatively hard materials, such as steel, can exhibit elastic compressibility. In some embodiments, the compliance member is a spring washer, such as a wave spring washer, a curved spring washer, or a Belleville spring washer. The springs disclosed herein may be pre-loaded to a desired stiffness, depending on the particular application. Springs 132 may bias bearing surfaces 122 of polycrystalline diamond bearing elements 120 on outer bearing ring 112 into direct contact with inner surface 104 of outer housing 100. Springs 132 may bias bearing surfaces 122 of polycrystalline diamond bearing elements 120 on inner bearing ring 114 into direct contact with outers surface 108 of drive shaft 106. Rotating machine 1000 may include a plurality of springs 132 that are coupled between the inner and outer bearing rings, and extend, intermittently, about the entire inner circumference of outer bearing ring 112 and about the entire outer circumference of inner bearing ring 114.

In some embodiments, one or more of outer housing 100, drive shaft 106, outer bearing ring 112, and inner bearing ring 114 are or include a metal or metal alloy that contains at least 2 wt. % of a diamond solvent-catalyst, such as iron, cobalt, nickel, ruthenium, rhodium, palladium, chromium, manganese, copper, titanium, tantalum, or alloys thereof. In some embodiments, one or more of outer housing 100, drive shaft 106, outer bearing ring 112, and inner bearing ring 114 are or include a metal or metal alloy that contains from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst, such as iron, cobalt, nickel, ruthenium, rhodium, palladium, chromium, manganese, copper, titanium, tantalum, or alloys thereof. As such, in some embodiments one or more of surfaces 104, 116, 126, and 108 contain at least 2 wt. %, or from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst, such as iron, cobalt, nickel, ruthenium, rhodium, palladium, chromium, manganese, copper, titanium, tantalum, or alloys thereof.

In operation, drive shaft 106 rotates as indicated via rotation arc 136. At low rotation speeds, such as at start-up when drive shaft 106 first begins to rotate after being static, bearing surfaces 122 of polycrystalline diamond bearing elements 120 on inner bearing ring 114 are in direct contact with outer surface 108. With bearing surfaces 122 in direct contact with outer surface 108, rotation of drive shaft 106 transfers torque to the engaged polycrystalline diamond bearing elements 120; thereby, causing inner bearing ring 114 to also rotate. With inner bearing ring 114 coupled with outer bearing ring 112 via meshing of gear teeth 128 and 130, inner bearing ring 114 transfers torque to outer bearing ring 112, such that outer bearing ring 112 also rotates. At low rotation speeds, such as at start-up when drive shaft 106 first begins to rotate after being static, bearing surfaces 122 of polycrystalline diamond bearing elements 120 on outer bearing ring 112 are in direct contact with inner surface 104.

Figure 2A:
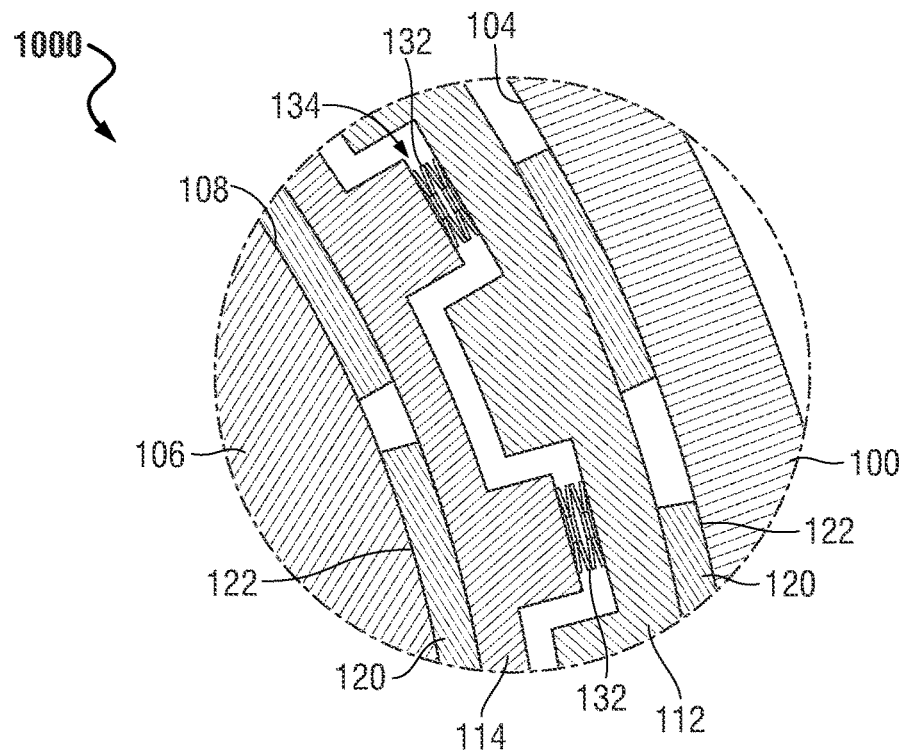
FIG. 2A is a detail view of the bearing assembly for rotating machinery of FIG. 1, with the polycrystalline diamond bearing elements in direct contact with a drive shaft and a bearing housing.
Figure 2B:
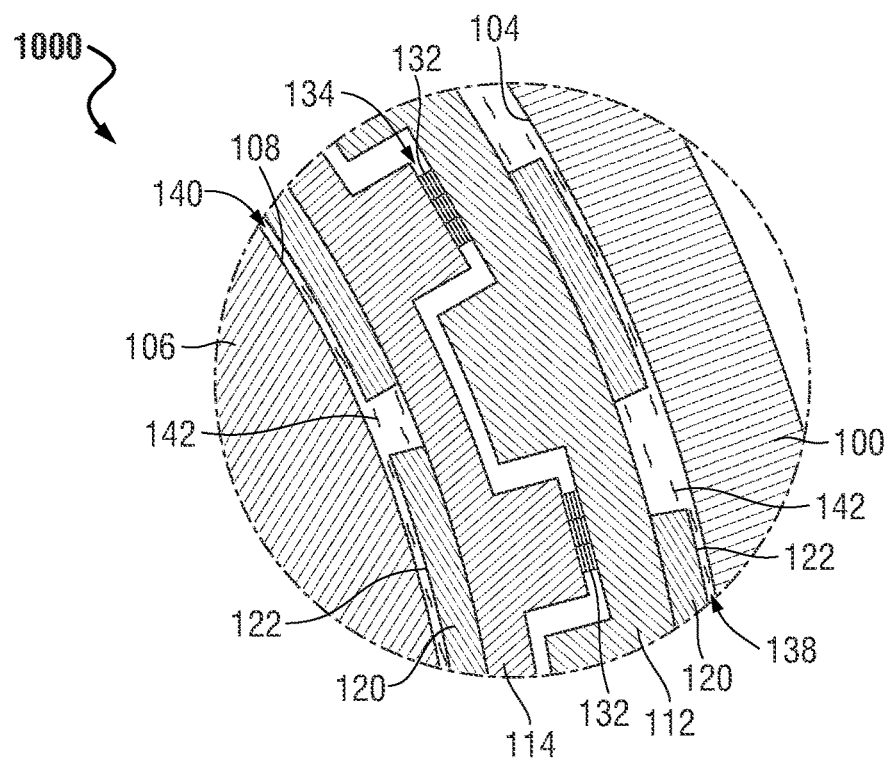
FIG. 2B is a detail view, similar to FIG. 2A, but with the polycrystalline diamond bearing elements spaced-apart, and out of direct contact, from the drive shaft and the bearing housing.

As shown in FIG. 2B, in some applications, after start-up and when rotation speed of drive shaft 106 has increased, a fluid film develops in space 138 between outer housing 100 and outer bearing ring 112, and in space 140 between inner bearing ring 114 and drive shaft 106. In particular, the fluid film develops between the bearing surfaces 122 and the inner surface 104, as well as between the bearing surfaces 122 and the outer surface 108. For example, and without limitation, in some applications, a lubricant, drilling fluid, drilling mud, or another fluid is pumped between the drive shaft 106 and outer housing 100, such that the fluid resides within spaces 138 and 140. In some such applications, rotating machine 1000 reaches operating conditions sufficient to cause the fluid pressure of the fluid to overcome the bias of springs 132, such that the fluid film is formed in spaces 138 and 140, such that bearing surfaces 122 of polycrystalline diamond bearing elements 120 on outer bearing ring 112 are forced out of direct contact with inner surface 104 of outer housing 100, and such that bearing surfaces 122 of polycrystalline diamond bearing elements 120 on inner bearing ring 114 are forced out of direct contact with outers surface 108 of drive shaft 106. Factors that may contribute to operating conditions sufficient for formation of the fluid film may include, but are not limited to, the operating temperature of rotating machine 1000, the rotation speed of drive shaft 106, properties of the lubricant, bearing loads on rotating machine 1000, and the flow rate of the fluid being pumped through rotating machine 1000. After start-up of rotating machine 1000, and before shut-down of rotating machine 1000, drive shaft 106 and bearing assembly 110 may rotate at the same or substantially the same rate.

During shut down, as the rotation of drive shaft 106 slows down to lower rotation speeds, when the fluid pressure of the fluid no longer overcomes the bias of springs 132, springs 132 once again bias bearing surfaces 122 of polycrystalline diamond bearing elements 120 on inner bearing ring 114 into direct contact with outer surface 108, and bias bearing surfaces 122 of polycrystalline diamond bearing elements 120 on outer bearing ring 112 into direct contact with inner surface 104. As such, rotating machine 1000 may develop a fluid film bearing between start-up and shut-down of rotating machine 1000, and may operate without a fluid film bearing during at least a portion of start-up and shut-down of rotating machine 1000. When operating without a fluid film, bearing surfaces 122 of polycrystalline diamond bearing elements 120 on inner bearing ring 114 are in direct and sliding contact with outer surface 108 and slide there-along as drive shaft 106 rotates, and bearing surfaces 122 of polycrystalline diamond bearing elements 120 on outer bearing ring 112 are in direct and sliding contact with inner surface 104 and slide there-along as bearing assembly 110 rotates. When operating with a fluid film, the fluid film may be of sufficient pressure to continuously or substantially continuously maintain the bearing surfaces 122 out of direct contact with outer surface 108 and inner surface 104. The presence of a fluid film may reduce the occurrence of wear on outer surface 108 and inner surface 104.

In operation, bearing assembly 110 is positioned between drive shaft 106 and outer housing 110 to limit lateral and/or axial movement of drive shaft 106, while allowing for free sliding rotation of drive shaft 106 during operation rotating machine 1000.

FIGS. 2A and 2B depict rotating machine 1000 before and after the development of a fluid film 142, respectively. As shown, when the fluid pressure of fluid 142 is sufficient to overcome the bias of springs 132, springs 132 compress such that outer bearing ring 112 and inner bearing ring 114 move toward one another, such that cavity 134 is reduced or eliminated, space 138 is formed between outer housing 100 and outer bearing ring 112, and space 140 is formed between shaft 106 and inner bearing housing 114. Thus, the spaces 138 and 140 provide for fluid film 142 therein, such that the bearing between shaft 106 and outer housing 100 is at least partially and at least temporarily a fluid film bearing.

Figure 3:
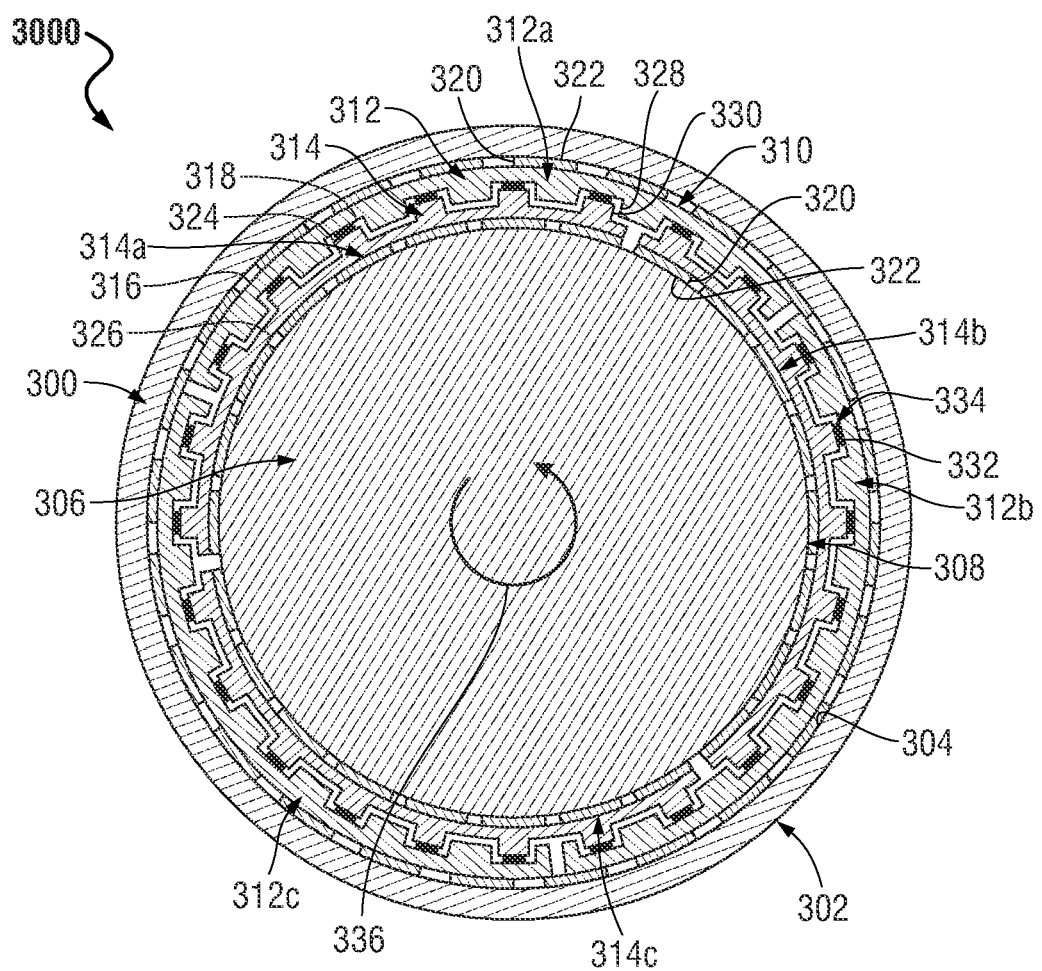
FIG. 3 is a lateral, cross-sectional view of a portion of another bearing assembly for rotating machinery in accordance with some embodiments.

FIG. 3 depicts another embodiment of a rotating machine, rotating machine 3000. Rotating machine 3000 is substantially identical to rotating machine 1000, with the exception that outer bearing ring 312 and inner bearing ring 314 are both segmented rings. As shown, inner bearing ring 314 includes three segments, 314a, 314b, and 314c, and outer bearing ring 312 includes three segments, 312a, 312b, and 312c.

While FIGS. 1-3 depict embodiments with multiple springs positioned to provide compliance between the inner and outer bearing rings, the present disclosure is not limited to such an embodiment, and may include only a single spring coupled between the inner and outer bearing rings. For example, and without limitation, a single coil spring, the same or similar to an energizer spring seal, may be positioned between the inner and outer bearing rings to provide elastic compliance thereto.

Figure 4:
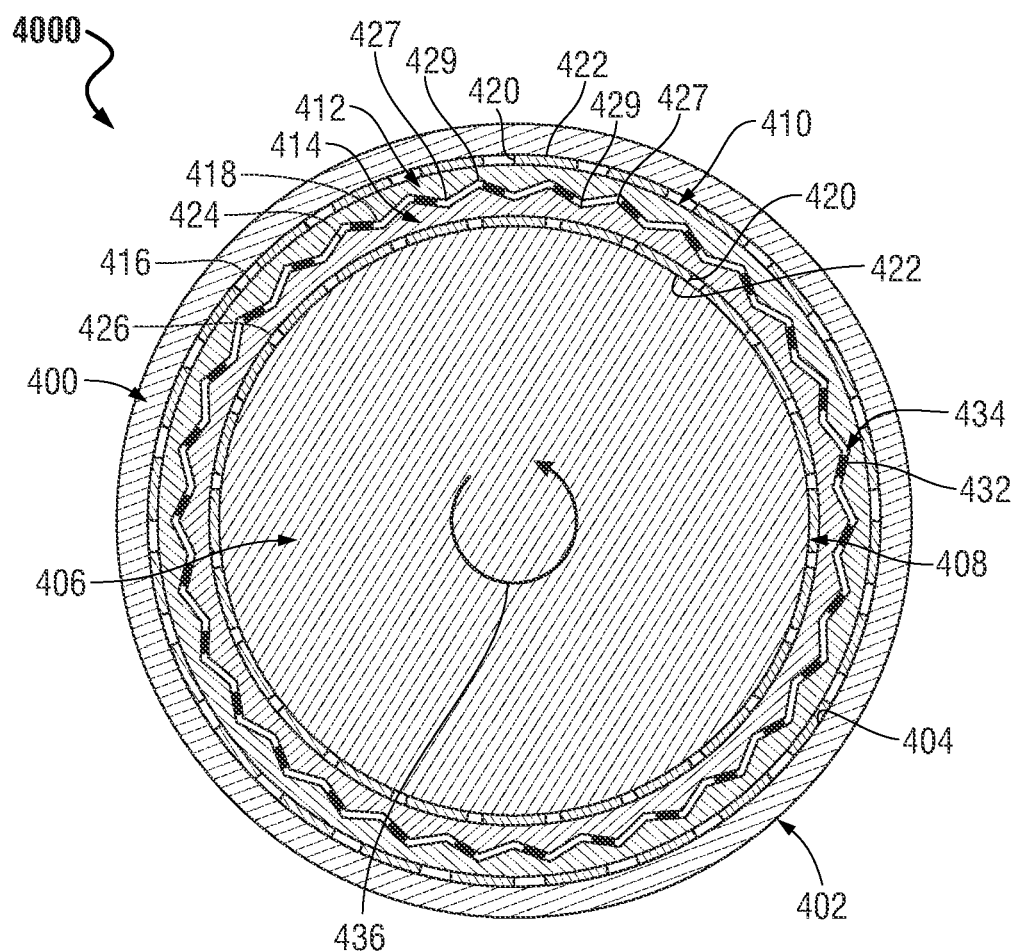
FIG. 4 is a lateral, cross-sectional view of a portion of another bearing assembly for rotating machinery in accordance with some embodiments.

FIG. 4 depicts another embodiment of a rotating machine, rotating machine 4000. Rotating machine 4000 is substantially identical to rotating machine 1000, with the exception of the shapes of inner surface 418 of outer bearing ring 412 and outer surface 424 of inner bearing ring 414. In FIG. 4, surfaces 418 and 424 are both shaped to define peaks 427 and valleys 429, with outer bearing ring 412 and inner bearing ring 414 are coupled such that the peaks 427 and valleys 429 of outer bearing ring 412 mesh with peaks 427 and valleys 429 of inner bearing ring 414, allowing for the transfer of torque from one bearing ring to the other.

Figure 5A:
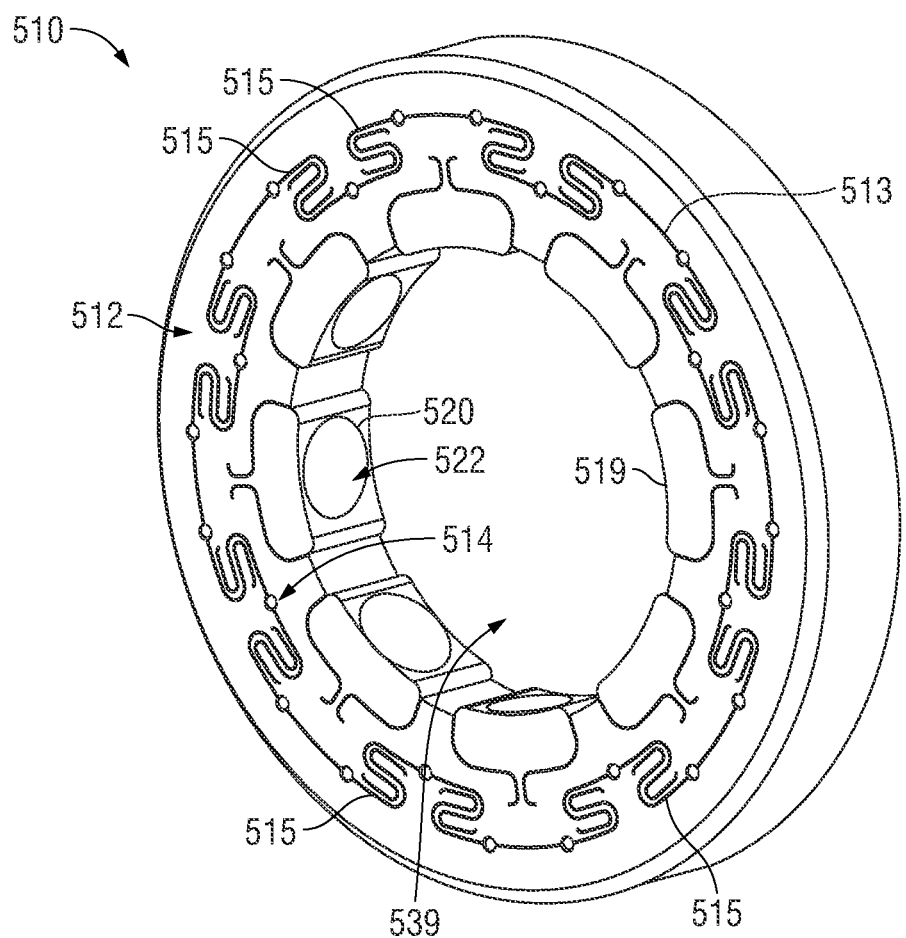
FIG. 5A is a perspective view of a portion of another bearing assembly for rotating machinery in accordance with some embodiments.
Figure 5B:
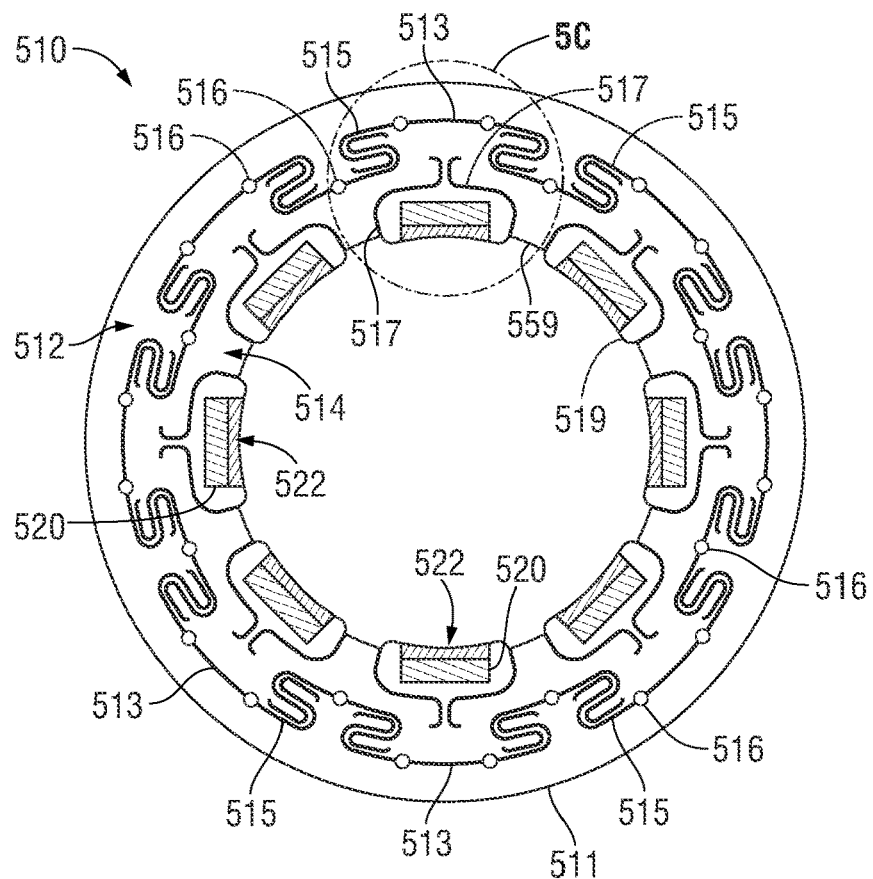
FIG. 5B is a plan view of the bearing assembly of FIG. 5A.
Figure 5C:
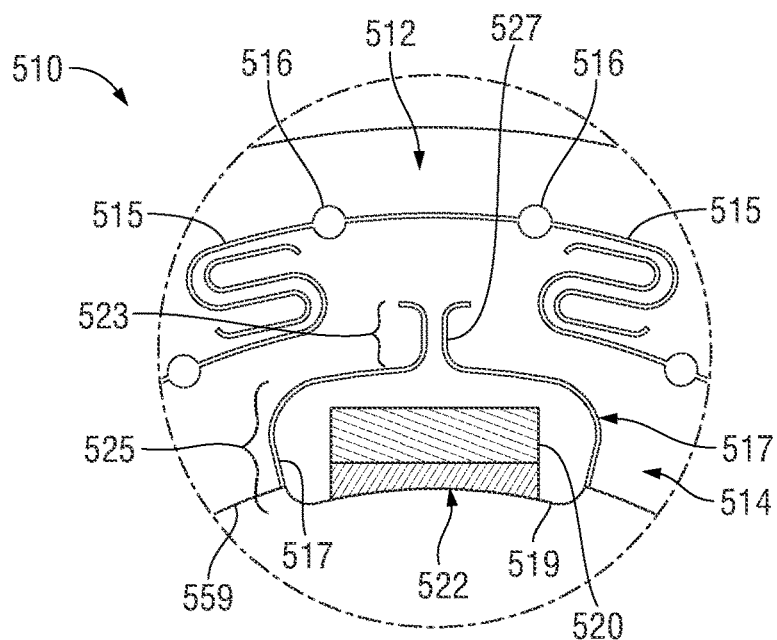
FIG. 5C is a detail view of the bearing assembly of FIG. 5B.

FIGS. 5A-5C depict another embodiment of a bearing assembly for use in rotating machinery, bearing assembly 510. In bearing assembly 510, rather than having a spring coupled between two separate inner and outer bearing rings, compliance and tilting is provided via machined cavities within a single bearing ring. The bearing ring can be machined to have one or more internal cavities configured to provide compliance and/or tilting capabilities to the bearing ring. Bearing assembly 510 includes bearing ring body 511, which is machined (e.g., via electrical discharge machining (EDM)) to have outer bearing section 512 (also referred to as outer flange) and inner bearing section 514 (also referred to as inner flange). Some embodiments of the bearing assemblies disclosed herein may be machined and provided with the cavities in accordance with the disclosure of U.S. Pat. No. 5,489,155, the entirety of which is incorporated herein by reference. The machining of bearing ring body 511 defines cavities 513 that are positioned between outer bearing section 512 and inner bearing section 514, and arranged such that outer bearing section 512 and inner bearing section 514 are compressible toward one another. Cavities 513 provide a gap within which fluid may enter to provide a fluid film bearing, such that cavities 513 provide a squeeze film area (also referred to as squeeze film bearing dampers and squeeze film dampers). Thus, in operation, cavities 513 are lubricated via fluid, providing viscous damping in bearing assembly 510. Cavities 513 may provide structural isolation between the rotor and stator of an associated rotating machine, reduce the amplitudes of rotor response to imbalance, and suppress rotor dynamic instability. The machining of bearing ring body 511 also includes machining cavities that define integral springs within bearing ring body 511, here shown as S-type springs 515 (i.e., S-shaped cavities). When fluid pressure exceeds the force of S-type springs 515, outer bearing section 512 and inner bearing section 514 are compressed toward one another.

Also shown is the holes 516, which are residual of the EDM process, and within which fluid may enter during operations. The machining of bearing ring body 511 also includes machining cavities 517 that define tillable and/or pivotable bearing pads 519 on inner surface 559 of inner bearing section 514. As shown in the detail view of FIG. 5C, two cavities 517 define bearing pad 519. The two cavities 517 that define bearing pad 519 define a first section 525, proximate inner surface 559, where the two cavities 517 are spaced apart from one another to define bearing pad 519. The two cavities 517 that define bearing pad 519 also define a second section 523, positioned further from inner surface 559 than first section 525, where the two cavities 517 are spaced more closely together than in first section 525 to define fulcrum 527. In operation, fluid enters cavities 517, and fulcrum 527 allows bearing pad 519 to tilt and/or pivot in response to loads thereon. Positioned on or integral with each bearing pad 519 is polycrystalline bearing compact 520, defining bearing surface 522.

The cavities providing within bearing ring body 511 are not limited to the particular arrangement shown in FIGS. 5A-5C, and may be arranged in other manners that provide compliance to bearing assembly 510. Bearing assembly 510 defines annulus 539 within which a drive shaft or other moving part may be positioned for engagement with engagement surfaces 522.

In some embodiments, the bearing assemblies disclosed herein include multiple bearing rings that are nested together. With references to FIGS. 6A and 6B, rotating machine 6000 is depicted. Rotating machine 6000 includes drive shaft 606 positioned within outer housing 600 (i.e., stator). Between drive shaft 606 and outer housing 600, bearing assembly 610 is positioned to interface the engagement of drive shaft 606 and outer housing 600. Bearing assembly 610 includes outer bearing ring 612 and inner bearing ring 614. Coupled to or integral with outer bearing ring 612 and inner bearing ring 614 are a plurality of polycrystalline diamond bearing elements 620. Each polycrystalline diamond bearing elements 620 of inner bearing ring 614 includes support member 617, which may be tungsten carbide, and polycrystalline diamond bearing element 619 coupled thereon and defining bearing engagement surface 622.

The polycrystalline diamond bearing elements 620 of inner bearing ring 614 define flat bearing engagement surfaces 622 that are arranged relative to drive shaft 606 such that a portion of bearing engagement surfaces 622 are engageable with outer surface 608 of drive shaft 606, and another portion of bearing engagement surfaces 621 is spaced-apart from drive shaft 606. As such, less than an entirety of bearing engagement surfaces 622 are engaged with drive shaft 606, even at low speeds during start-up and shut-down. Also, inner surface 626 of inner bearing ring 614 is maintained in a spaced-apart relationship from outer surface 608 of drive shaft 606.

The polycrystalline diamond bearing elements 620 of outer bearing ring 612 define flat bearing engagement surfaces 622 that are arranged relative to drive shaft inner bearing ring 614 such that a portion of bearing engagement surfaces 622 are engageable with outer surface 624 of inner bearing ring 614, and another portion of bearing engagement surfaces 621 is spaced-apart from inner bearing ring 614. As such, less than an entirety of bearing engagement surfaces 622 are engaged with inner bearing ring 614, even at low speeds during start-up and shut-down. Also, inner surface 618 of outer bearing ring 612 is maintained in a spaced-apart relationship from outer surface 624 of inner bearing ring 612.

In operation, drive shaft 606 rotates. Bearing surfaces 622 are in direct contact with outer surface 608, such that rotation of drive shaft 606 transfers torque to the engaged polycrystalline diamond bearing elements 620; thereby, causing inner bearing ring 614 to also rotate. Outer bearing ring 612 is coupled with outer housing 600, such that outer bearing ring 612 remains static relative to outer housing 6000.

In some embodiments, outer bearing ring 612 of bearing assembly 610 can include a material that is elastically compressible under bearing loads. In FIG. 6B, outer bearing ring 612 has a geometry configured to provide compliance to bearing assembly 610. In particular, outer bearing ring 612 is machined to have cavity 617, which defines spring 615. In operation, under sufficient loads and/or surface speeds, spring 615 compresses, at least partially closing cavity 617. In some embodiments, bearing assembly 610 includes a squeeze film damper. In operation, bearing assembly 610 may reduce the relative sliding speed of engaged surfaces of rotating machine 6000, such as by reducing the relative sliding speed between PDCs 620 and the engagement surfaces of the rotating machine 6000 relative to an otherwise identical bearing assembly that includes only a single bearing ring instead of multiple nested bearing rings. While shown as including only two nested bearing rings, the bearing assemblies disclosed herein are not limited to including only two nested bearing rings, and may include other numbers of multiple nested bearing rings, such as three or more nested bearing rings. Without being bound by theory, it is believed that more nested bearing rings within a bearing assembly provide for more reduction in sliding speeds in the rotating machine.

In operation of bearing assembly 610, rings 612 and 614 exhibit differentials in revolutions per minute, such that ring 612 rotates at a lower rate than rings 614. While not shown, one or both of rings 612 and 614 may be multi-part, segmented rings. Also shown are outer surface 626 and inner surface 618 of outer bearing ring 612, and inner surface 626 of inner bearing ring 614.

Figure 6A:
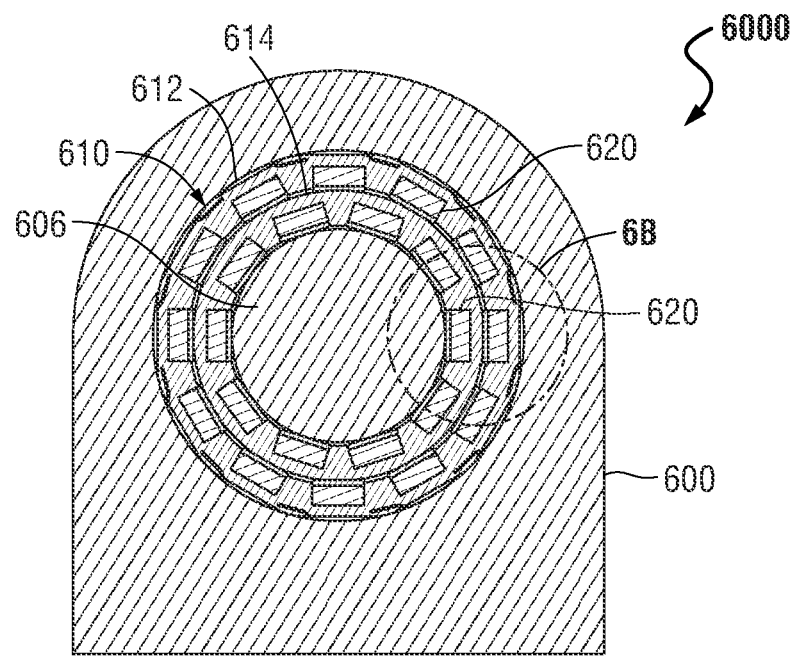
FIG. 6A is a lateral, cross-sectional view of a portion of another bearing assembly for rotating machinery in accordance with some embodiments having nested bearing rings with flat bearing pads.
Figure 6B:
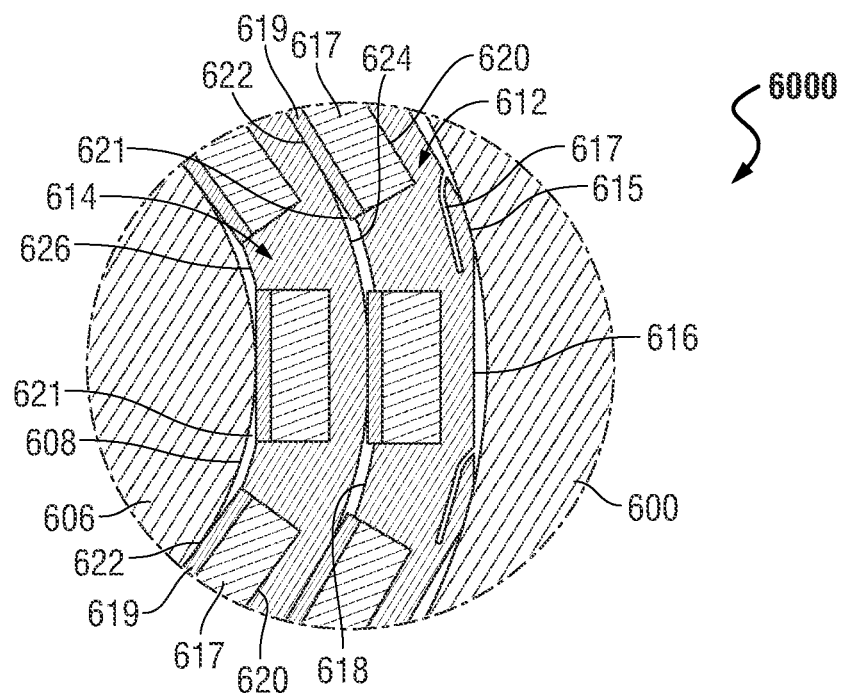
FIG. 6B is a detail view of the bearing assembly for rotating machinery of FIG. 6A.
Figure 7A:
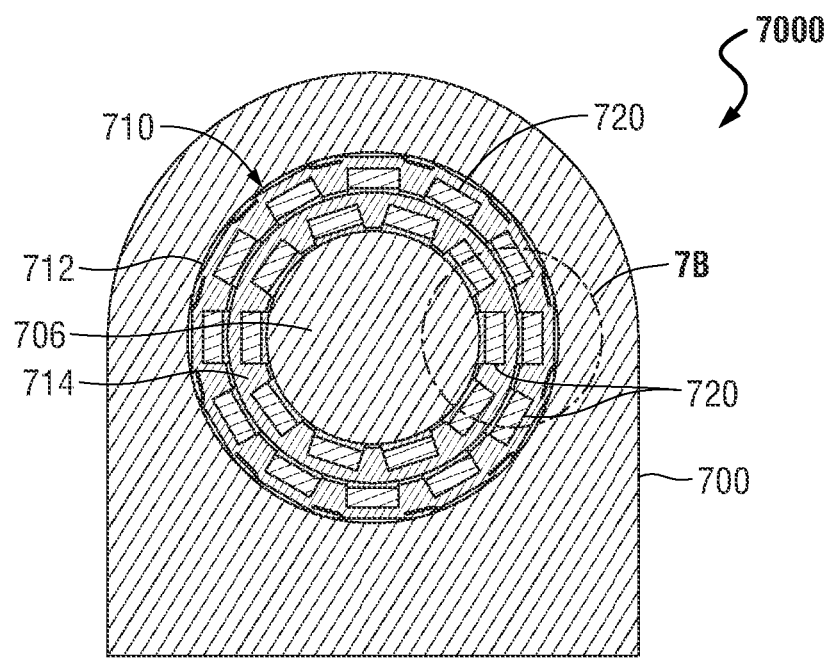
FIG. 7A is a lateral, cross-sectional view of a portion of another bearing assembly for rotating machinery in accordance with some embodiments having nested bearing rings with arcuate bearing pads.
Figure 7B:
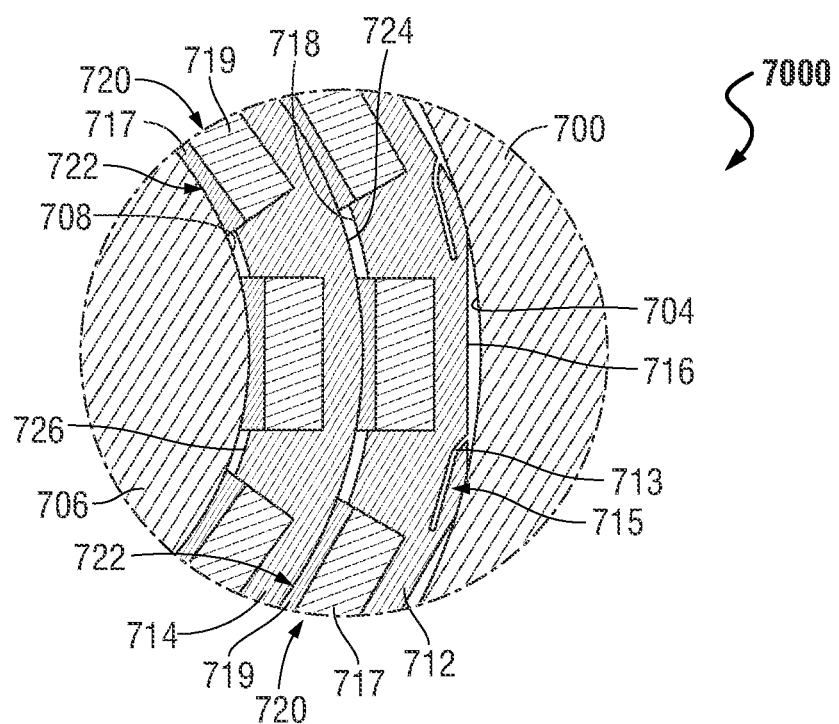
FIG. 7B is a detail view of the bearing assembly for rotating machinery of FIG. 7A.
Figure 8A:
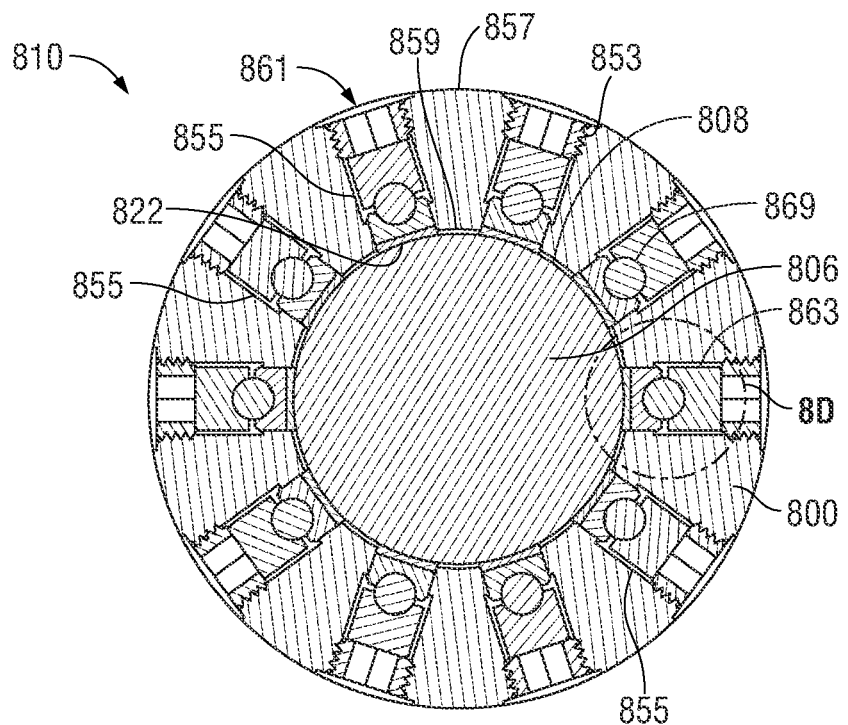
FIG. 8A is a lateral, cross-sectional view of a portion of another bearing assembly for rotating machinery in accordance with some embodiments having arcuate bearing pads configured to tilt during movement of the drive shaft.
Figure 8B:
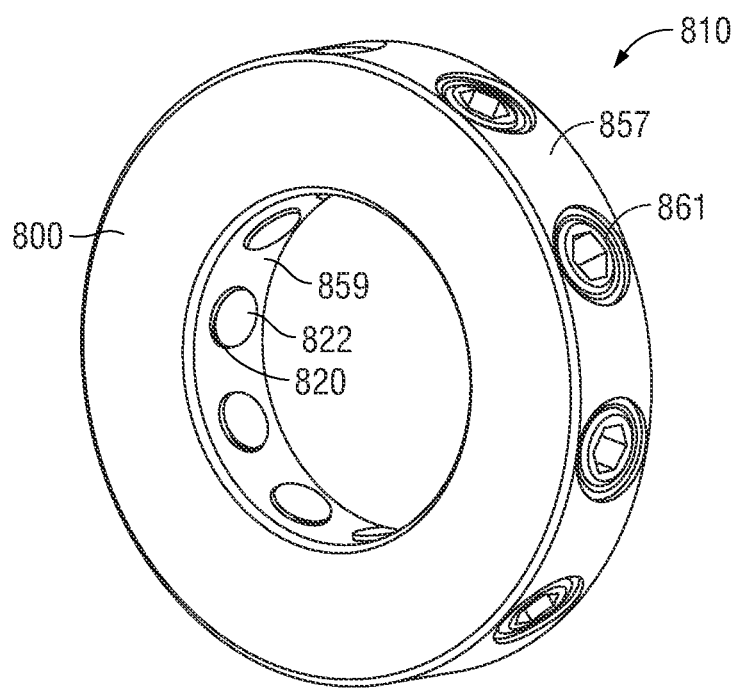
FIG. 8B is a view of the bearing assembly for rotating machinery of FIG. 8A with the drive shaft not shown.
Figure 8C:
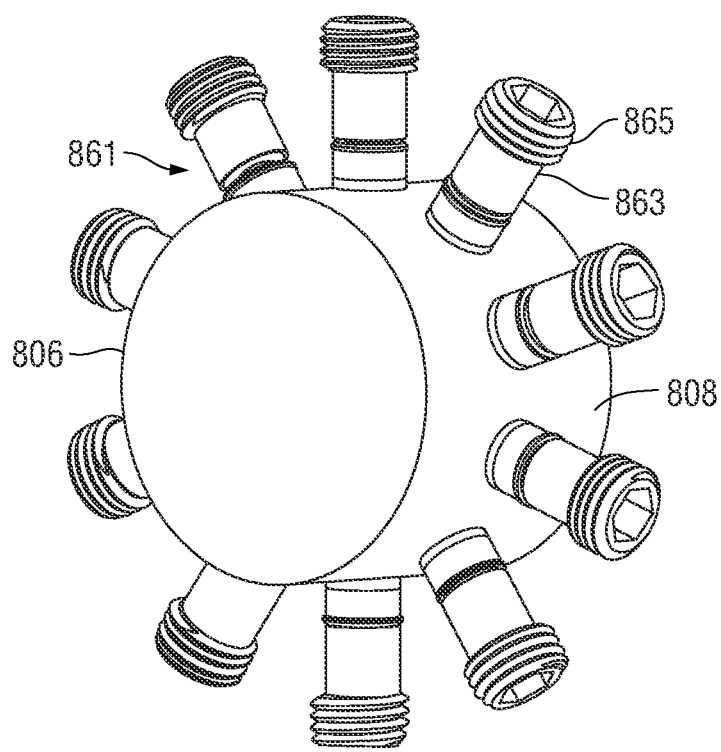
FIG. 8C is a view of the bearing assembly for rotating machinery of FIG. 8A with the bearing housing not shown.
Figure 8D:
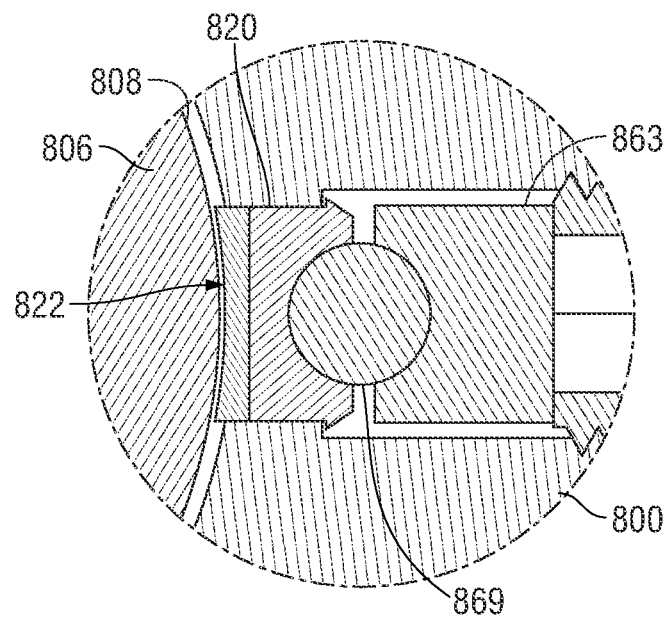
FIG. 8D is a detail view of a portion of the bearing assembly of FIG. 8A.

The bearing assemblies shown in FIGS. 7A and 7B are substantially identical to those shown in FIGS. 6A and 6B, with the exception that the bearing engagement surfaces 722 are arcuate, rather than flat. With arcuate bearing engagement surfaces 722, the entirety or substantially the entirety of bearing engagement surfaces 722 are engageable with outer surface 708 of drive shaft 706. The arcuate surfaces of bearing engagement surfaces 722 may be shaped to mate with the arcuate outer surface 708 of drive shaft 706, such that, as drive shaft 706 rotates, bearing engagement surfaces 722 maintain a constant or substantially constant contact with outer surface 708.

In some embodiments, outer bearing ring 712 of bearing assembly 710 can include a material that is elastically compressible under bearing loads. In FIG. 7B, outer bearing ring 712 has a geometry configured to provide compliance to bearing assembly 710. In particular, outer bearing ring 712 is machined to have cavity 713, which defines spring 715. In operation, under sufficient loads, spring 715 compresses, at least partially closing cavity 713. In some embodiments, bearing assembly 710 includes a squeeze film damper. In operation, bearing assembly 710 may reduce the relative sliding speed of engaged surfaces of rotating machine 7000, such as by reducing the relative sliding speed between PDCs 720 and the engagement surfaces of the rotating machine 7000 relative to an otherwise identical bearing assembly that includes only a single bearing ring instead of multiple nested bearing rings. While shown as including only two nested bearing rings, the bearing assemblies disclosed herein are not limited to including only two nested bearing rings, and may include other numbers of multiple nested bearing rings, such as three or more nested bearing rings. Without being bound by theory, it is believed that more nested bearing rings within a bearing assembly provide for more reduction in sliding speeds in the rotating machine.

In operation of bearing assembly 710, rings 712 and 714 exhibit differentials in revolutions per minute, such that ring 712 rotates at a lower rate than rings 714. While not shown, one or both of rings 712 and 714 may be multi-part, segmented rings.

Some embodiments include bearing assemblies that include tilting bearing elements. With references to FIGS. 8A-8D, bearing assembly 810 and drive shaft 806 are shown. Bearing assembly 810 includes bearing housing 800, which may be, form, or be coupled with a portion of a rotating machine, drill string, or other machine. Bearing housing 800 includes outer surface 857 and inner surface 859, with inner surface 859 defining an annulus within which drive shaft 806 is positioned. Bearing housing 800 includes a plurality of sockets 855 therein, extending from outer surface 857 to inner surface 859. Within each socket 855 is positioned a bearing member 861. Each bearing member 861 includes base 863, which includes threads 865 for threaded engagement with corresponding threads 853 of housing 800. Each bearing member 861 includes a polycrystalline diamond bearing element 820 having an engagement surface 822. Each polycrystalline diamond bearing element 820 is engaged with a base 863 via tilt coupling 869. Tilt coupling 869 can be any coupling capable of attaching polycrystalline diamond bearing element 820 with base 863 and of allowing polycrystalline diamond bearing element 820 to tilt relative to base. Tilt coupling 869 may be a spherical ball (allowing for misalignment between bearing assembly 810 and shaft 806) or cylindrical pin. In some embodiments, bearing member 861 and/or base 863 thereof includes a material that is elastically compressible, providing compliance and damping under load.

Each polycrystalline diamond bearing element 820 is positioned and secured within a socket 855 such that the engagement surface 822 thereof is engaged with the opposing engagement surface, outer surface 808, of drive shaft 806. In operation, drive shaft 806 rotates within the annulus defined by bearing housing 800. As drive shaft 806 rotates, polycrystalline diamond bearing elements 820 have compliance sufficient to enable elements 820 to tilt relative to base 863, such as to maintain engagement between engagement surfaces 822 and outer surface 808 of drive shaft 806. The engagement surfaces 822 are shown as arcuate, which allows to engagement surfaces 822 to maintain full or substantially full contact with surface 808 during operation. However, the engagement surfaces are not limited to be arcuate, and may be flat. The capability of polycrystalline diamond bearing element 820 to tilt relative the shaft 806 provides space between engagement surface 822 and outer surface 808 where a fluid film can develop during operations. The direction of tilting of the bearing pads disclosed herein is in response to the direction of rotation.

Some embodiments include bearing assemblies that include tilting and compliant bearing elements. The bearing assemblies show in FIGS. 9A-9D are substantially identical to those shown in FIGS. 8A-8D, with the exception that the polycrystalline diamond bearing elements 920 are mounted onto springs 932 of the bearing member 961. Within each socket 955 is positioned a bearing member 961. Each bearing member 961 includes base 963, which includes threads 965 for threaded engagement with corresponding threads 953 of housing 900. Each bearing member 961 includes a spring 932 coupled with base 963, and a tilt coupling 969 coupled with the spring 932. Each polycrystalline diamond bearing element 920, having an engagement surface 922, is engaged with a tilt coupling 969. Tilt coupling 969 can be any coupling capable of attaching polycrystalline diamond bearing element 920 with spring 932 and of allowing polycrystalline diamond bearing element 920 to tilt relative to base 963 along arc 999. Spring 932 allows each polycrystalline diamond bearing element 920 to compress towards base 963, along direction 997.

Each polycrystalline diamond bearing element 920 is positioned and secured within a socket 955 such that the engagement surface 922 thereof is engaged with the opposing engagement surface, outer surface 908, of drive shaft 906. In operation, drive shaft 906 rotates within the annulus defined by bearing housing 900. As drive shaft 906 rotates, polycrystalline diamond bearing elements 920 have compliance sufficient to enable elements 920 to tilt relative to base 963. The engagement surfaces 922 are shown as arcuate; however, the engagement surfaces are not limited to be arcuate, and may be flat.

In operation a low speed, such as during start-up and shut-down, engagement surfaces 922 are in direct contact with opposing engagement surface, outer surface 908, of drive shaft 906. In some applications, after start-up and when rotation speed of drive shaft 906 has increased, a fluid film 942 develops between engagement surfaces 922 and outer surface 908 of drive shaft 906. For example, and without limitation, in some applications, a lubricant, drilling fluid, drilling mud, or another fluid occupies space between the drive shaft 906 and outer housing 900. In some such applications, operating conditions are sufficient to cause the fluid pressure of the fluid to overcome the bias of springs 932, such that the fluid film 942 is formed, such that bearing surfaces 922 of polycrystalline diamond bearing elements 920 are forced out of direct contact with outer surface 908 of drive shaft 906, along line 997. FIG. 9D depicts bearing assembly 910 in an operational state having such a fluid film 942. During shut down, as the rotation of drive shaft 906 slows down to lower rotation speeds, when the fluid pressure of the fluid no longer overcomes the bias of springs 932, springs 932 once again bias bearing surfaces 922 of polycrystalline diamond bearing elements 920 into direct contact with outer surface 908. Springs 932 are not limited to the particular structure shown, and may be any of the compliance members disclosed herein, such as a rubber member.

The tilt couplings disclosed herein can be offset, relative to the polycrystalline diamond surfaces, such that the tilt couplings are positioned at an expected and/or theoretical center of load on the polycrystalline diamond surfaces.

Figure 9A:
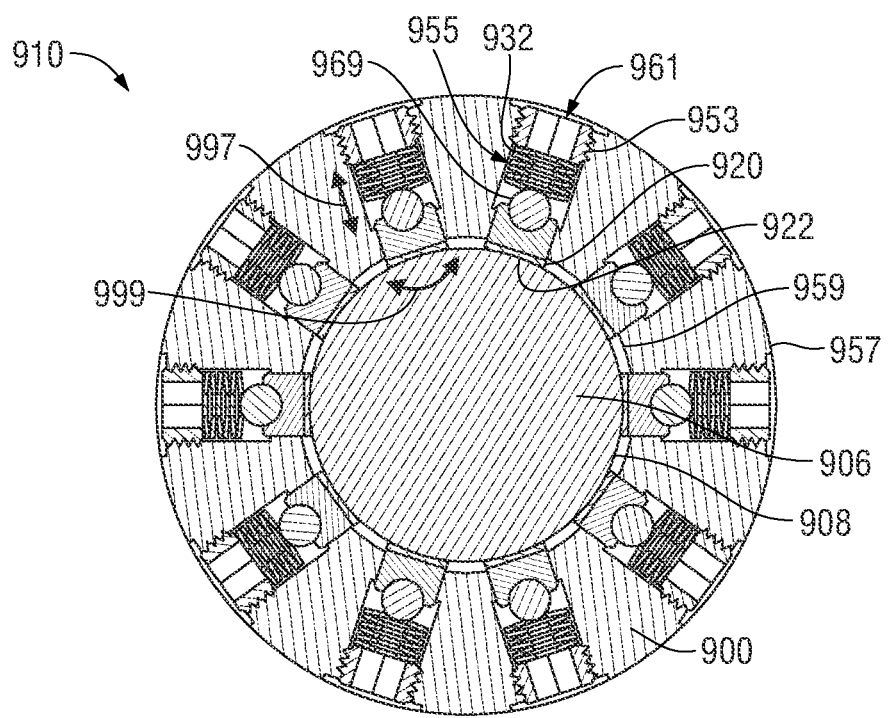
FIG. 9A is a lateral, cross-sectional view of a portion of another bearing assembly for rotating machinery in accordance with some embodiments having arcuate bearing pads configured to tilt and compliantly compress during movement of the drive shaft.
Figure 9B:
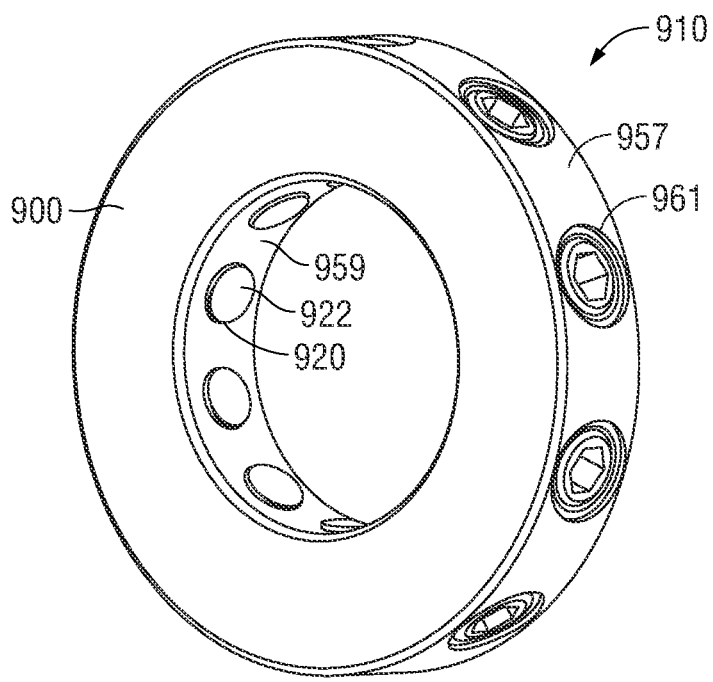
FIG. 9B is a view of the bearing assembly for rotating machinery of FIG. 9A with the drive shaft not shown.
Figure 9C:
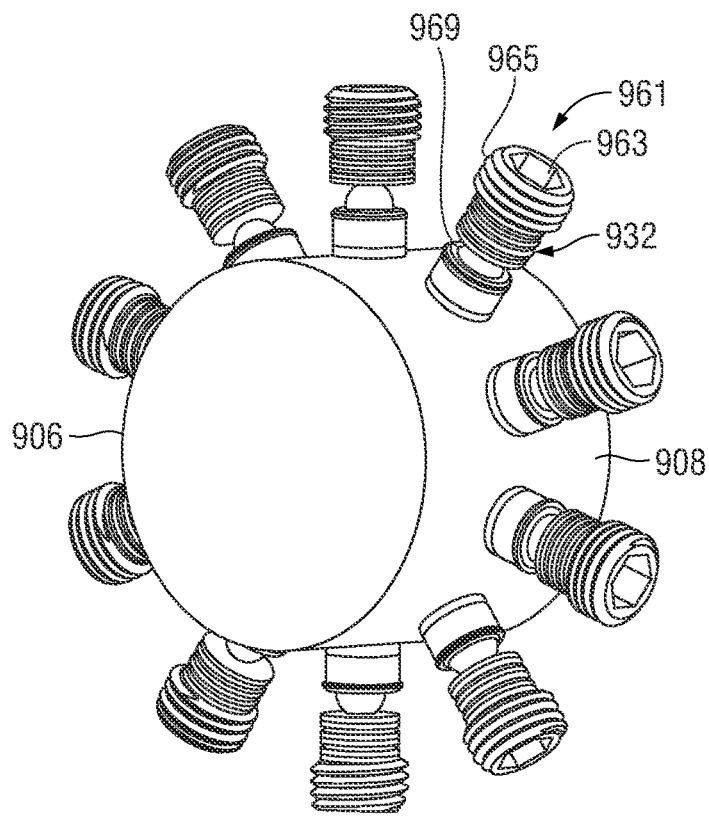
FIG. 9C is a view of the bearing assembly for rotating machinery of FIG. 9A with the bearing housing not shown.
Figure 9D:
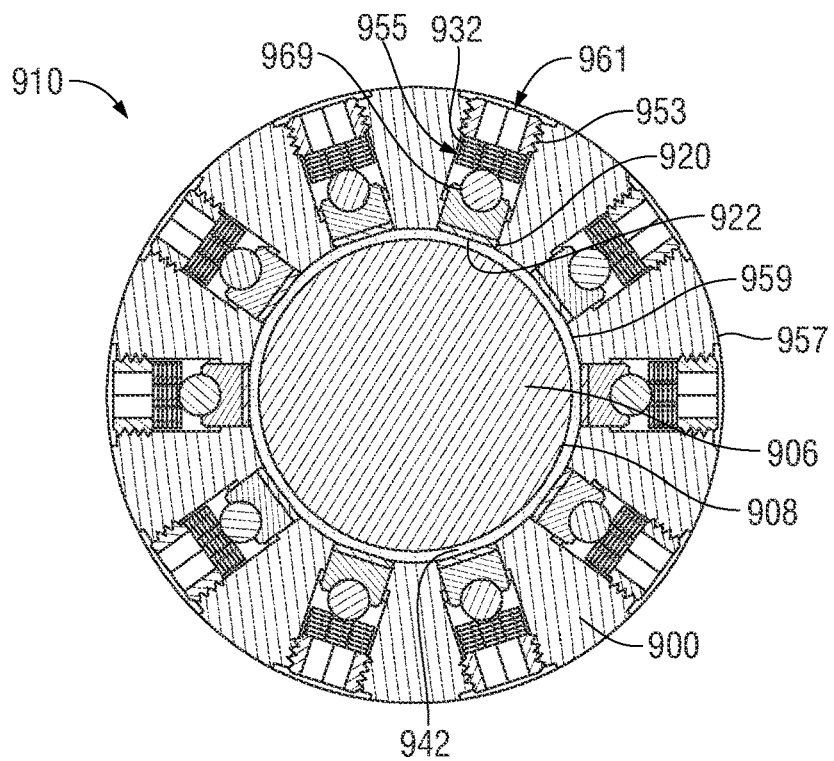
FIG. 9D is a view of the bearing assembly for rotating machinery of FIG. 9A with a fluid film.
Figure 10:
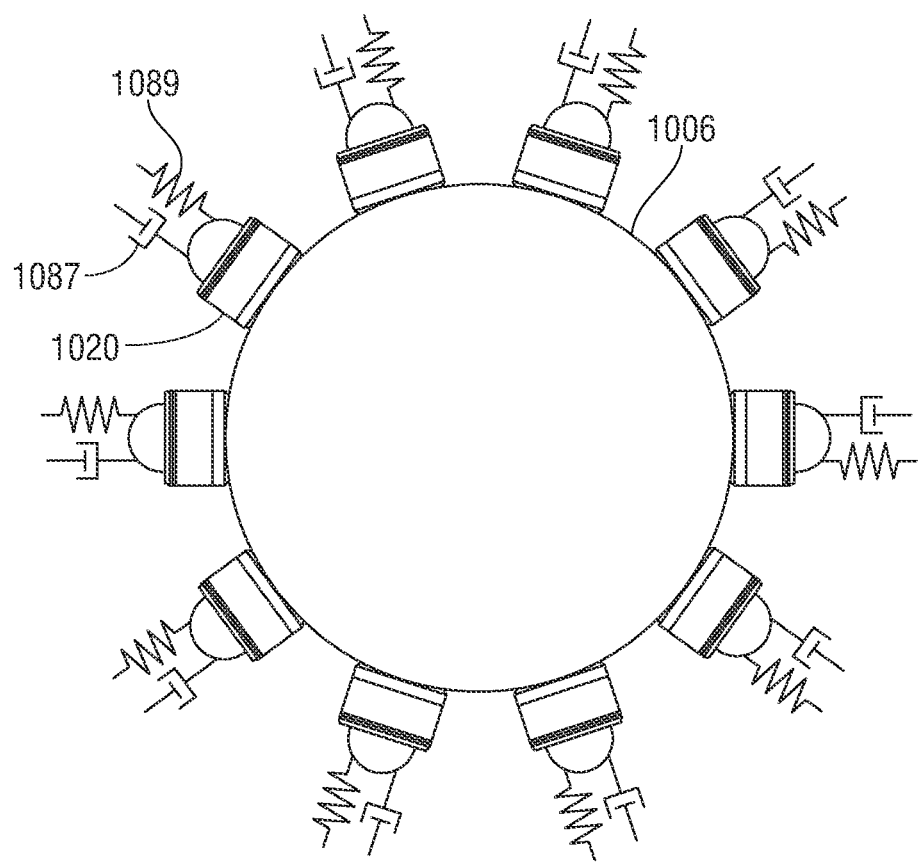
FIG. 10 is a schematic showing the stiffness and damping of bearing elements in accordance with some embodiments.

FIG. 10 is a simplified schematic similar to FIG. 9A, but showing some of the forces involved in compliance, including stiffness 1089 and damping 1087, on polycrystalline diamond bearing elements 1020 that are engaged with a drive shaft 1006.

Figure 11:
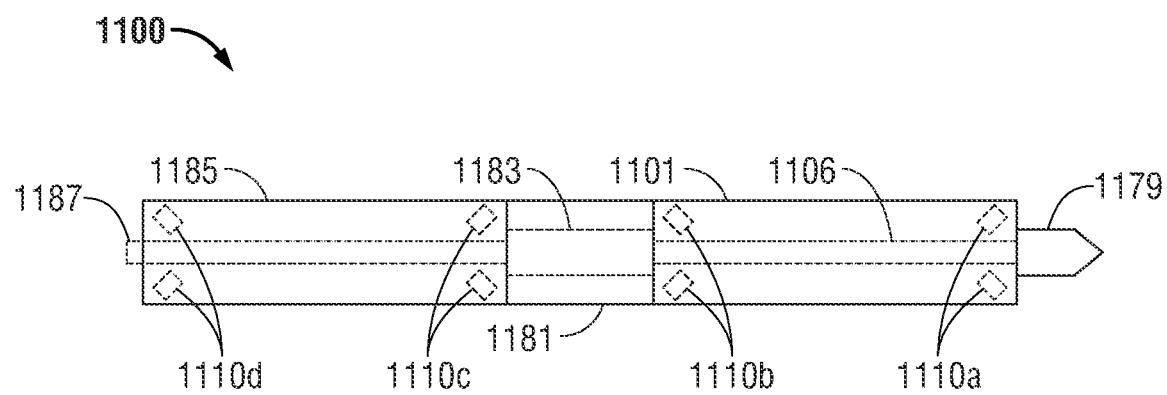
FIG. 11 is a portion of a drilling tool in accordance with some embodiments, including a drive shaft supported by multiple bearing assemblies.

FIG. 11 depicts rotating machine 1100, including rotor 1187 movably positioned within stator 1185, and including drive shaft 1106 movably positioned within housing 1101. Rotor 1187 is coupled with drive shaft 1106 via transmission 1183. Transmission is positioned within transmission housing 1181. Drive shaft 1106 is coupled with drill bit 1179. In operation, rotor 1187 is driven to rotate, such as via passing a drilling mud through stator 1185. The rotation of rotor 1187 drives the rotation of drive shaft 1106 through transmission 1183, and the rotation of drive shaft 1106 drives the rotation of drill bit 1179. The engagement between drive shaft 1106 and housing 1101 is interfaced by two bearing assemblies 1110a and 1110b. Also, the engagement between rotor 1187 and stator 1185 is interfaced by two bearing assemblies 1110c and 1110d. Each bearing assembly 1110a-1110d may be a bearing assembly in accordance with the present disclosure, such as those shown and described with reference to FIGS. 1-10.

In some embodiments, the polycrystalline diamond bearing elements disclosed herein include thermally stable polycrystalline diamond, either supported or unsupported by tungsten carbide, or polycrystalline diamond compact. In certain applications, the polycrystalline diamond bearing elements disclosed herein have increased cobalt content transitions layers between the outer polycrystalline diamond surface and a supporting tungsten carbide slug. The polycrystalline diamond bearing elements may be supported by tungsten carbide, or may be unsupported, "standalone" polycrystalline diamond bearing elements that are mounted directly to the bearing component. The polycrystalline diamond bearing elements may by non-leached, leached, leached and backfilled, thermally stable, coated via chemical vapor deposition (CVD), or processed in various ways as known in the art.

In some embodiments, the bearing engagement surfaces of the polycrystalline diamond bearing elements disclosed herein are planar, convex, or concave. In some embodiments, wherein the bearing engagement surfaces of the polycrystalline diamond bearing elements are concave, the concave bearing engagement surfaces are oriented with the axis of the concavity in line with the circumferential rotation of the drive shaft; thereby, reducing the occurrence of edge contact between polycrystalline diamond bearing element and the drive shaft, and providing for a substantially linear area contact between the polycrystalline diamond bearing element and drive shaft, generally with the deepest portion of the concavity. Engagement between polycrystalline diamond bearing elements and drive shaft may be exclusively or substantially interfaced by the bearing engagement surface and the surface of the drive shaft. In some embodiments, the polycrystalline diamond bearing elements have beveled edges.

The polycrystalline diamond bearing elements may have diameters as small as 3 mm (about ⅛") or as large as 75 mm (about 3"), depending on the application and the configuration and diameter of the bearing. Typically, the polycrystalline diamond bearing elements have diameters between 8 mm (about 5/16") and 25 mm (about 1").

Although the polycrystalline diamond bearing elements are most commonly available in cylindrical shapes, it is understood that the technology of the application may be practiced with polycrystalline diamond bearing elements that are square, rectangular, oval, any of the shapes described herein with reference to the Figures, or any other appropriate shape known in the art. In some applications, the radial bearings have one or more convex, contoured polycrystalline diamond bearing elements mounted on a rotor (or stator) in sliding contact with a stator (or rotor).

In some applications, the polycrystalline diamond bearing elements are deployed in bearing rings. A non-limiting example is a bearing ring of five planar face polycrystalline diamond bearing elements deployed on a distal portion of a stator and another bearing ring of five planar face polycrystalline diamond bearing elements deployed on a proximal portion of the stator. Thus, high-performance polycrystalline diamond bearing elements assemblies can be deployed to ensure stable operation along the length of the stator/rotor interface.

The polycrystalline diamond bearing elements may be arranged in any pattern, layout, spacing or staggering within the bearing assembly to provide the desired support, without concern for the need for overlapping contact with polycrystalline diamond bearing elements engagement surfaces on the opposing bearing component. The polycrystalline diamond bearing elements disclosed herein are, in some embodiments, not shaped to conform to the opposing engagement surface. The polycrystalline diamond bearing elements disclosed herein are, in other embodiments, shaped to conform to the opposing engagement surface.

One performance criterion is that the polycrystalline diamond bearing element is configured and positioned in such a way as to preclude any edge contact with the opposing engagement surface or component. For a planar faced polycrystalline diamond bearing element placed on the stator, such polycrystalline diamond bearing elements typically experience less than full face contact with the rotor. That is, as the rotor rotates against the polycrystalline diamond bearing elements, the engagement surface contact area is less than full face. In some aspects, the polycrystalline diamond bearing elements are subjected to edge radius treatment. In embodiments that employ planar or concave polycrystalline diamond bearing elements, edge radius treatment of such polycrystalline diamond bearing elements is employed. One purpose of employing an edge radius treatment is to reduce or avoid potential for outer edge cutting or scribing at the outer limits of the linear engagement area of a given polycrystalline diamond bearing elements with the opposing engagement surface (e.g., a curved surface).

In some embodiments, the polycrystalline diamond bearing elements are mounted in one or more bearing rings that are deployed to interface engagement between the rotor and stator.

In some aspects, the opposing engaging surface, that is, the bearing surface that is engaged with the polycrystalline diamond bearing surface, has carbon applied thereto. In some such aspects, the carbon is applied to the opposing bearing surface prior to engagement with the engagement surface. For example, the opposing bearing surface may be saturated with carbon. Without being bound by theory, it is believed that such application of carbon reduces the ability of the diamond solvent-catalyst in the opposing engagement surface to attract carbon through graphitization of the surface of the polycrystalline diamond bearing element. That is, the carbon that is applied to the opposing bearing surface functions as a sacrificial layer of carbon. In addition, the opposing bearing surface may be treated via any of the methods disclosed and described in the '758 Application.

The opposing bearing surfaces disclosed herein may be surfaces that contain at least 2 wt. % of diamond solvent-catalyst.

In certain applications, a solid lubricant source, for example, a graphite or hexagonal boron nitride stick or inclusion, either energized or not energized, is in contact with the opposing engagement surface. In other embodiments, the sliding engagement between engagement surface and opposing engagement surface is non-lubricated.

The bearing assemblies disclosed herein may be used in rotating machinery, such as in turbines and components thereof. As used herein, downhole tools and downhole drilling tools may be or include, but are not limited to, rotary steerable tools, turbines, jars, reamers, agitators, MWD tools, LWD tools, and drilling motors. Drill strings may include a number of segments, including drill piping or tubulars extending from the surface, a mud motor (i.e., a positive displacement progressive cavity mud powered motor) and a drill bit. The mud motor may include a rotor catch assembly, a power section, a transmission, a bearing package (bearing assembly), and a bit drive shaft with a bit connection. The power section generally includes a stator housing connected to and part of the drill string, and a rotor. The bearing assemblies disclosed herein may be a portion of a bottom hole assembly (BHA), such as is shown in FIGS. 14A-15B, 16A-16F, 17A-17F, and 18A-19G of the '335 Application. For example, the bearing assemblies disclosed herein may be conical bearings.

One skilled in the art would understand that the bearing assemblies disclosed herein are not limited to the particular arrangements of parts shown and described with reference to FIGS. 1-11. One skilled in the art would understand that the features shown and described with respect to FIGS. 1-11 with respect to bearing assemblies can be combined with and/or applied to the bearings and drilling tools disclosed in the '335 Application, the '608 Application, the '617 Application, the '631 Application, and the '310 Application.

The bearing assemblies disclosed herein may form a portion of a machine or other apparatus or system. In some such aspects, the proximal end of the stator or outer housing may be connected to another component, such as a drill string or motor housing by threaded connection, welding, or other connection means as known in the art. In some aspects, if the bearing assembly is used in a downhole application, the distal end of the rotor (drive shaft) may be augmented by a thrust bearing and may carry a threaded connection for the attachment of a drill bit, or the distal end of the rotor may be a drill bit directly formed on and/or positioned on the end of the mandrel of the rotor. The component connections are not limited to downhole applications, and can be applied to other applications, for example wind turbine energy generators, mining, or marine applications. Furthermore, discrete versions of the bearing assemblies described herein may be used in a broad array of other applications including, but not limited to, heavy equipment, automotive, turbines, transmissions, rail cars, mining, computer hard drives, centrifuges, medical equipment, pumps, and motors.

In certain aspects, the bearing assemblies disclosed herein are suitable for deployment and use in harsh environments (e.g., downhole). In some such aspects, the bearing assemblies are less susceptible to fracture than bearing assemblies where a polycrystalline diamond engagement surface engages with another polycrystalline diamond engagement surface. In certain aspects, such harsh environment suitable radial bearings provide enhanced service value in comparison with bearing assemblies that include a polycrystalline diamond engagement surface engaged with another polycrystalline diamond engagement surface. Furthermore, the bearing assemblies disclosed herein may be capable of being spaced apart at greater distances that the spacings required when using bearing assemblies that include a polycrystalline diamond engagement surface engaged with another polycrystalline diamond engagement surface. In certain applications, the bearing assemblies disclosed herein can act as a rotor catch, such as in downhole applications. In lubricated environments, the bearing assemblies may benefit from the hydrodynamic effect of the lubricant or fluid film creating a clearance between the moving and stationary elements of the bearing assembly.

In some embodiments, the bearing assemblies disclosed herein provide polycrystalline diamond bearing elements having with compliance without use of tilt pads.

While many of the embodiments included herein show and describe the compliant polycrystalline diamond bearing elements positioned on a bearing ring that is arranged between a rotor and stator, the present disclosure is not limited to such embodiments. For example, the compliant bearings disclosed herein may be positioned on the bearing housing (stator), on the drive shaft (rotor), on a bearing ring positioned between the bearing housing and drive shaft, or any combination thereof. For example, in some embodiments, tilting bearing pads may be provided on the drive shaft, and compliance and damping features may be provided on the bearing housing. However, without being bound by theory, it is believed that, due to centripetal forces present during operations, that embodiment includes the compliant bearing assemblies on a bearing ring positioned between the bearing housing and drive shaft.

Figure 12:
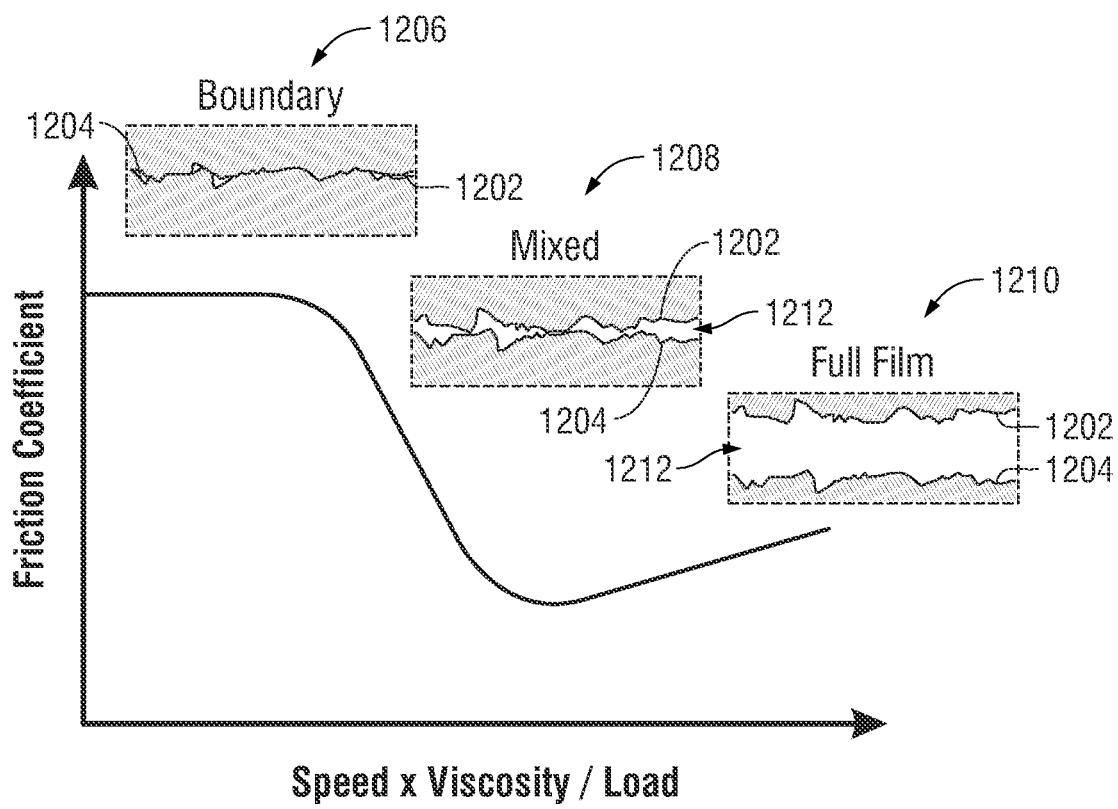
FIG. 12 is an exemplary Stribeck curve.

FIG. 12, an exemplary Stribeck curve, is illustrative of the development of fluid films in bearings. In FIG. 12, the engagement between bearing surfaces 1202 and 1204 are shown under three different bearing scenarios, including boundary lubrication 1206 with the bearing surfaces 1202 and 1204 in direct surface contact with one another; mixed lubrication 1208, with some fluid film 1212 developed between portions of the bearing surfaces 1202 and 1204, but with portions of the bearing surfaces 1202 and 1204 still in direct surface contact with one another; and full-film (hydrodynamic or elasto-hydrodynamic) lubrication 1210 with fluid film 1212 developed between portions of the bearing surfaces 1202 and 1204, and with no portion of the bearing surfaces 1202 and 1204 in direct surface contact with one another.

Certain embodiments will now be described.

Embodiment 1. A rotating machine, the rotating machine comprising: a stator; a rotor movably coupled with the stator, the rotor having a first opposing bearing engagement surface that comprises a material that contains from 2 to 100 weight percent of a diamond solvent-catalyst, based on a total weight of the material; and a compliant bearing assembly positioned between the rotor and the stator, wherein the compliant bearing assembly interfaces engagement between the rotor and the stator, the compliant bearing assembly comprising: a first bearing ring comprising a first plurality of polycrystalline diamond bearing elements, wherein each polycrystalline diamond bearing element has a first bearing engagement surface that is engaged with the first opposing engagement surface; and a spring coupled with the first bearing ring and positioned on the first bearing ring such that a distance between the first bearing engagement surfaces are the first opposing engagement surface is variable.

Embodiment 2. The rotating machine of embodiment 1, wherein the stator has a second bearing surface defining an annulus, wherein the rotor is positioned within the annulus, and wherein the compliant bearing assembly is positioned within the annulus of the bearing housing.

Embodiment 3. The rotating machine of embodiment 2, wherein the rotor is a drive shaft and the stator is a bearing housing.

Embodiment 4. The rotating machine of embodiment 2 or 3, wherein the compliant bearing assembly comprises a second bearing ring having a second plurality of polycrystalline diamond bearing elements coupled thereon and having second engagement surfaces that are engaged with the second opposing bearing surface of the stator, wherein the first bearing ring is positioned between the second bearing ring and the rotor, wherein the second bearing ring is positioned between the first bearing ring and the stator, and wherein the spring is coupled between the first bearing ring and the second bearing ring such that a distance between the first bearing ring and the second bearing ring is variable.

Embodiment 5. The rotating machine of embodiment 4, wherein the spring has at least two positions, the at least two positions including: a first position wherein the spring is decompressed and the first engagement surfaces are on direct contact with the first opposing engagement surface, and the second engagement surfaces are in direct contact with the second opposing engagement surface; and a second position wherein the spring is compressed and a fluid film is present between the first engagement surfaces and the first opposing engagement surface, and a fluid film is present between the second engagement surfaces and the second opposing engagement surface.

Embodiment 6. The rotating machine of embodiment 4 or 5, wherein an outer surface of the first bearing ring is shaped to define a series of valleys and peaks, wherein an inner surface of the second bearing ring is shaped to define a series of valleys and peaks, and wherein the valleys and peaks of the first bearing ring are meshed with the valleys and peaks of the second bearing ring.

Embodiment 7. The rotating machine of embodiment 6, wherein the valleys and peaks of the inner and outer bearing rings define gear teeth.

Embodiment 8. The rotating machine of any of embodiments 4 to 7, wherein rotation of the rotor transfers torque to the first bearing ring, and wherein rotation of the first bearing ring transfers torque to the second bearing ring.

Embodiment 9. The rotating machine of any of embodiments 1 to 8, wherein the first bearing ring comprises a body having cavities therein, the cavities defining an outer bearing section and an inner bearing section, wherein the cavities are positioned between the outer bearing section and the inner bearing section and define a squeeze film area.

Embodiment 10. The rotating machine of embodiment 9, wherein the cavities further define the spring within the body of the first bearing ring.

Embodiment 11. The rotating machine of embodiment 9 or 10, further comprising additional cavities defining tiltable bearing pads on an inner surface of the first bearing ring, wherein the first plurality of polycrystalline diamond bearing elements are positioned on the tiltable bearing pads.

Embodiment 12. The rotating machine of embodiment 11, wherein the additional cavities defining the tiltable bearing pads define a fulcrum configured to allow the tiltable bearing pads to tilt in response to load and surface speed.

Embodiment 13. The rotating machine of any of embodiments 1 to 12, wherein the first opposing engagement surface comprises iron or an alloy thereof, cobalt or an alloy thereof, nickel or an alloy thereof, ruthenium or an alloy thereof, rhodium or an alloy thereof, palladium or an alloy thereof, chromium or an alloy thereof, manganese or an alloy thereof, copper or an alloy thereof, titanium or an alloy thereof, or tantalum or an alloy thereof.

Embodiment 14. The rotating machine of any of embodiments 1 to 13, wherein the first bearing ring is a segmented bearing ring comprising multiple segments.

Embodiment 15. The rotating machine of any of embodiments 1 to 14, wherein the spring comprises a mechanical spring.

Embodiment 16. The rotating machine of any of embodiments 1 15, wherein the spring comprises an elastically compressible material.

Embodiment 17. The rotating machine of embodiment 16, wherein the elastically compressible material comprises an elastic polymer.

Embodiment 18. The rotating machine of any of embodiments 1 to 17, wherein the spring has at least two positions, the at least two positions including: a first position wherein the spring is decompressed and the first engagement surfaces are in direct contact with the first opposing engagement surface; and a second position wherein the spring is compressed and a fluid film is present between the first engagement surfaces and the first opposing engagement surface.

Embodiment 19. A rotating machine, the rotating machine comprising: a stator; a rotor movably coupled with the stator, the rotor having a first opposing bearing engagement surface that comprises a material that contains from 2 to 100 weight percent of a diamond solvent-catalyst, based on a total weight of the material; a bearing assembly positioned between the rotor and the stator, wherein the bearing assembly interfaces engagement between the rotor and the stator, the bearing assembly comprising: a first bearing ring comprising a first plurality of polycrystalline diamond bearing elements on an inner surface thereof, wherein each polycrystalline diamond bearing element has a first bearing engagement surface that is engaged with the first opposing engagement surface; a second bearing ring comprising a second plurality of polycrystalline diamond bearing elements having second bearing engagement surfaces, wherein the second bearing engagement surfaces are engaged with an outer surface of the first bearing ring; and wherein the first and second bearing rings are arranged in a nested configuration between the stator and the rotor such that the second bearing ring is positioned between the first bearing ring and the stator and the first bearing ring is positioned between the second bearing ring and the rotor.

Embodiment 20. The rotating machine of embodiment 19, wherein the bearing is a compliant bearing assembly comprising a spring on an outer surface of the second bearing ring, the spring positioned such that a distance between the second bearing ring the stator is variable.

Embodiment 21. The rotating machine of embodiment 20, wherein the spring is defined by a cavity within the second bearing ring, the spring comprising a portion of the second bearing ring capable of at least partially opening and closing the cavity in response to load and surface speed.

Embodiment 22. The rotating machine of any of embodiments 19 to 21, wherein the first and second bearing engagement surfaces are planar.

Embodiment 23. The rotating machine of any of embodiments 19 to 22, wherein the first and second bearing engagement surfaces are arcuate.

Embodiment 24. The rotating machine of any of embodiments 19 to 23, wherein rotation of the rotor transfers torque to the first bearing ring, wherein rotation of the first bearing ring transfers torque to the second bearing ring, and wherein the first and second bearing rings exhibit different rates of rotation.

Embodiment 25. A rotating machine, the rotating machine comprising: a bearing housing having an outer surface and an inner surface, the inner surface defining an annulus; a rotor movably coupled within the annulus of the bearing housing, the rotor having an opposing engagement surface that comprises a material that contains from 2 to 100 weight percent of a diamond solvent-catalyst, based on a total weight of the material; a plurality of sockets in the bearing housing; and a plurality of polycrystalline diamond bearing elements coupled with the sockets, wherein each polycrystalline diamond bearing element has a bearing engagement surface that is engaged with the opposing engagement surface, and wherein the polycrystalline diamond bearing elements are capable of tilting relative to the outer surface of the bearing housing.

Embodiment 26. The rotating machine of embodiment 25, wherein each polycrystalline diamond bearing element is coupled with a base within one of the sockets via a tiltable coupling such that the polycrystalline diamond bearing elements are capable of tilting relative to the bases.

Embodiment 27. The rotating machine of embodiment 26, wherein each base is threadably coupled with the bearing housing.

Embodiment 28. The rotating machine of any of embodiments 25 to 27, wherein, engaged between each polycrystalline diamond bearing element and the bearing housing, is a spring, such that a distance between the bearing engagement surface of each polycrystalline diamond bearing element and the opposing engagement surface is variable.

Embodiment 29. The rotating machine of embodiment 28, wherein the spring has at least two positions, the at least two positions including a first position wherein the spring is decompressed and the bearing engagement surfaces are in direct contact with the opposing engagement surface, and a second position wherein the spring is compressed and a fluid film is positioned between the bearing engagement surfaces and the opposing engagement surface.

Embodiment 30. A method of bearing load in a rotating machine, the method comprising: providing a bearing housing comprising a first bearing ring comprising a first plurality of polycrystalline diamond bearing elements, each having a first bearing engagement surface, the bearing housing having an outer surface and having an inner surface defining an annulus; providing a rotor that is movably coupled with a stator, wherein the rotor has an opposing engagement surface that comprises a material that contains from 2 to 100 weight percent of a diamond solvent-catalyst, based on a total weight of the material; positioning the bearing housing between the rotor and the stator to interface engagement between the rotor and the stator, wherein the first bearing engagement surfaces are engaged with the opposing engagement surface; and providing the polycrystalline diamond bearing elements with compliance such that a distance between the first bearing engagement surfaces and the opposing engagement surface is variable in response to load and surface speed.

Embodiment 31. The method of embodiment 30, comprising passing a fluid through the annulus of the bearing housing, wherein the compliance provides for at least two positions of the first polycrystalline diamond bearing elements, including a first position wherein the first bearing engagement surfaces are in direct contact with the opposing engagement surface, and a second position wherein a fluid film is formed between the first bearing engagement surfaces and the opposing engagement surface.

Embodiment 32. The method of embodiment 30, comprising bearing radial and thrust loads on the drive shaft with the compliant bearing assembly.

Embodiment 33. The method of any of embodiments 30 to 32, wherein the compliance is provided by engaging a spring between the first polycrystalline diamond bearing elements and the bearing housing.

Embodiment 34. The method of any of embodiments 30 to 33, wherein the bearing housing comprises a second bearing ring comprising a second polycrystalline diamond bearing element thereon, each having a second bearing engagement surface that is engaged with a second opposing engagement surface of the stator.

Embodiment 35. The method of embodiment 34, wherein the compliance is provided by positioning a spring between the first bearing ring and the second bearing ring such that a distance between the first and second bearing rings is variable in response to load and surface speed.

Embodiment 36. The method of any of embodiments 30 to 35, wherein providing the compliance comprises providing cavities within a body of the bearing housing, the cavities defining an outer bearing section and an inner bearing section, wherein the cavities are positioned between the outer bearing section and the inner bearing section and define a squeeze film area, and wherein the cavities define a spring within the body of the bearing housing.

Embodiment 37. The method of embodiment 36, wherein the cavities define tiltable bearing pads in the bearing housing, wherein the first plurality of polycrystalline diamond bearing elements are positioned on the tiltable bearing pads, and wherein the cavities define a fulcrum configured to allow the tiltable bearing pads to tilt in response to load and surface speed.

Embodiment 38. The method of any of embodiments 30 to 37, wherein providing the compliance comprises coupling the first plurality of polycrystalline diamond bearing elements with the bearing housing via a coupling configured to allow the polycrystalline diamond bearing elements to tilt relative to the bearing housing, via a spring, or combinations thereof.

Embodiment 39. The method of embodiment 38, wherein the polycrystalline diamond bearing elements are threadably coupled within sockets in the bearing housing.

Embodiment 40. A method of bearing load in a rotating machine, the method comprising: providing a first bearing ring comprising a first plurality of polycrystalline diamond bearing elements, each having a first bearing engagement surface; providing a second bearing ring comprising a second plurality of polycrystalline diamond bearing elements, each having a second bearing engagement surface; providing a rotor that is movably coupled with a stator, wherein the rotor has an opposing engagement surface that comprises a material that contains from 2 to 100 weight percent of a diamond solvent-catalyst, based on a total weight of the material; positioning the first bearing ring between the rotor and the stator, wherein the first bearing engagement surfaces are engaged with the opposing engagement surface; positioning the second bearing ring between the stator and the first bearing ring, wherein the second bearing engagement surfaces are engaged with an outer surface of the first bearing ring, and wherein the first and second bearing rings are arranged in a nested configuration.

Embodiment 41. The method of embodiment 40, further comprising providing a spring on an outer surface of the second bearing ring, the spring positioned such that a distance between the second bearing ring the stator is variable in response to load and surface speed.

Embodiment 42. The method of embodiment 40 or 41, wherein rotation of the rotor transfers torque to the first bearing ring, wherein rotation of the first bearing ring transfers torque to the second bearing ring, and wherein the first and second bearing rings exhibit different rates of rotation.

Embodiment 43. A bearing assembly for use in rotating machines, the bearing assembly comprising: a first bearing ring comprising a first plurality of polycrystalline diamond bearing elements on an inner surface thereof, wherein each polycrystalline diamond bearing element has a first bearing engagement surface; and a spring coupled with the first bearing ring and positioned on the first bearing ring such that a position of the first bearing engagement surfaces is variable.

Embodiment 44. The bearing assembly of embodiment 43, further comprising a second bearing ring having a second plurality of polycrystalline diamond bearing elements coupled on an outer surface thereof and having second engagement surfaces, wherein the spring is coupled between an outer surface of the first bearing ring and an inner surface of the second bearing ring such that a distance between the first bearing ring and the second bearing ring is variable.

Embodiment 45. The bearing assembly of embodiment 43 or 44, wherein the outer surface of the first bearing ring is shaped to define a series of valleys and peaks, wherein the inner surface of the second bearing ring is shaped to define a series of valleys and peaks, and wherein the valleys and peaks of the first bearing ring are meshed with the valleys and peaks of the second bearing ring.

Embodiment 46. The bearing assembly of any of embodiments 43 to 45, wherein the valleys and peaks of the inner and outer bearing rings define gear teeth.

Embodiment 47. The bearing assembly of embodiment 44, wherein the first bearing ring comprises a body having cavities therein, the cavities defining an outer bearing section and an inner bearing section, wherein the cavities are positioned between the outer bearing section and the inner bearing section and define a squeeze film area.

Embodiment 48. The bearing assembly of embodiment 47, wherein the cavities further define the spring within the body of the first bearing ring.

Embodiment 49. The bearing assembly of embodiment 47, further comprising additional cavities defining tiltable bearing pads on an inner surface of the first bearing ring, wherein the first plurality of polycrystalline diamond bearing elements are positioned on the tiltable bearing pads.

Embodiment 50. The bearing assembly of embodiment 49, wherein the additional cavities defining the tiltable bearing pads define a fulcrum configured to allow the tiltable bearing pads to tilt in response to load and surface speed.

Embodiment 51. The bearing assembly of any of embodiments 43 to 50, wherein the first bearing ring is a segmented bearing ring comprising multiple segments.

Embodiment 52. The bearing assembly of any of embodiments 43 to 51, wherein the spring comprises a mechanical spring.

Embodiment 53. The bearing assembly of any of embodiments 43 to 52, wherein the spring comprises an elastically compressible material.

Embodiment 54. The bearing assembly of embodiment 53, wherein the elastically compressible material comprises an elastic polymer.

Embodiment 55. A bearing assembly for use in rotating machinery, the bearing assembly comprising: a first bearing ring comprising a first plurality of polycrystalline diamond bearing elements on an inner surface thereof; a second bearing ring comprising a second plurality of polycrystalline diamond bearing elements having second bearing engagement surfaces, wherein the second bearing engagement surfaces are engaged with an outer surface of the first bearing ring; and wherein the first and second bearing rings are arranged in a nested configuration.

Embodiment 56. The bearing assembly of embodiment 55, wherein the bearing is a compliant bearing assembly comprising a spring on an outer surface of the second bearing ring.

Embodiment 57. The bearing assembly of embodiment 56, wherein the spring is defined by a cavity within the second bearing ring, the spring comprising a portion of the second bearing ring capable of at least partially opening and closing the cavity in response to load and surface speed.

Embodiment 58. The bearing assembly of any of embodiments 55 to 57, wherein the first and second bearing engagement surfaces are planar.

Embodiment 59. The bearing assembly of any of embodiments 55 to 58, wherein the first and second bearing engagement surfaces are arcuate.

Embodiment 60. A bearing assembly for use in rotating machines, the bearing assembly comprising: a bearing housing having an outer surface and an inner surface, the inner surface defining an annulus; a plurality of sockets in the bearing housing; and a plurality of polycrystalline diamond bearing elements coupled with the sockets, wherein each polycrystalline diamond bearing element has a bearing engagement surface, and wherein the polycrystalline diamond bearing elements are capable of tilting relative to the outer surface of the bearing housing.

Embodiment 61. The bearing assembly of embodiment 60, wherein each polycrystalline diamond bearing element is coupled with a base within one of the sockets via a tiltable coupling such that the polycrystalline diamond bearing elements are capable of tilting relative to the bases.

Embodiment 62. The bearing assembly of embodiment 61, wherein each base is threadably coupled with the bearing housing.

Embodiment 63. The bearing assembly of any of embodiments 60 to 62, wherein, engaged between each polycrystalline diamond bearing element and the bearing housing, is a spring, such that a position of the bearing engagement surfaces of each polycrystalline diamond bearing element is variable.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A machine, the machine comprising:
a stator;
a rotor coupled with the stator;
wherein one of the stator and the rotor comprises a first metal bearing surface, the first metal bearing surface comprising a first metal that contains at least 2 weight percent of a diamond solvent-catalyst based on a total weight of the first metal;
a first polycrystalline diamond bearing element having a first diamond bearing surface, wherein the first polycrystalline diamond bearing element is positioned such that the first diamond bearing surface is engaged with the first metal bearing surface; and
wherein the first polycrystalline diamond bearing element is compliant relative to the first metal bearing surface such that a distance between the first diamond bearing surface and the first metal bearing surface is variable.

2. The machine of claim 1, further comprising a spring coupled with the first polycrystalline diamond bearing element, wherein the spring provides compliance to the first polycrystalline diamond bearing element.

3. The machine of claim 2, wherein the spring is a mechanical spring or an elastically compressible material.

4. The machine of claim 2, wherein the spring has at least two positions, the at least two positions including:
a first position wherein the diamond bearing surface is in direct contact with the metal bearing surface; and
a second position wherein the spring is compressed relative to the first position and wherein a fluid film is present between the diamond bearing surface and the metal bearing surface.

5. The machine of claim 1, wherein the first polycrystalline diamond bearing element is coupled on a first bearing ring, the first bearing ring positioned between the rotor and the stator, and wherein the first metal bearing surface is a surface of the rotor.

6. The machine of claim 5, further comprising a second bearing ring having a second polycrystalline diamond bearing element coupled thereon, wherein the second bearing ring is positioned between the first bearing ring and the stator;
wherein the stator has a second metal bearing surface thereon, the second metal bearing surface comprising a second metal that contains at least 2 weight percent of a diamond solvent-catalyst based on a total weight of the second metal;
wherein the second polycrystalline diamond bearing element has a second diamond bearing surface, wherein the second polycrystalline diamond bearing element is positioned such that the second diamond bearing surface is engaged with the second metal bearing surface; and
wherein the second polycrystalline diamond bearing element is compliant relative to the second metal bearing surface such that a distance between the second diamond bearing surface and the second metal bearing surface is variable.

7. The machine of claim 6, further comprising a spring coupled between the first and second bearing rings, wherein the spring provides compliance to the first and second polycrystalline diamond bearing elements.

8. The machine of claim 6, wherein the first and second bearing rings each comprise multiple, discrete ring segments.

9. The machine of claim 6, wherein the first and second bearing rings are meshed together.

10. The machine of claim 6, wherein first bearing ring comprises a body having cavities therein, wherein the cavities provide compliance to the first polycrystalline bearing element.

11. The machine of claim 10, wherein the cavities comprise
a cavity that forms a squeeze film area in the body.

12. The machine of claim 10, wherein the cavities comprise a cavity that forms a spring in the body, the spring coupled with the first polycrystalline bearing element.

13. The machine of claim 10, wherein the cavities comprise a cavity that forms a tiltable bearing pad in the body, the tiltable bearing pad coupled with the first polycrystalline bearing element.

14. The machine of claim 5, further comprising a second bearing ring having a second polycrystalline diamond bearing element coupled thereon, wherein the first and second bearing rings are arranged in a nested configuration between the stator and the rotor such that the second bearing ring is positioned between the first bearing ring and the stator and the first bearing ring is positioned between the second bearing ring and the rotor;
wherein the second polycrystalline diamond bearing element has a second diamond bearing surface, wherein the second polycrystalline diamond bearing element is positioned such that the second diamond bearing surface is engaged with the first bearing ring.

15. The machine of claim 14, further comprising a spring on the second bearing ring, the spring positioned to engage with the stator such that a distance between the second bearing ring and the stator is variable.

16. The machine of claim 5, further comprising a socket in the first bearing ring, wherein the first polycrystalline diamond bearing element is coupled with the socket.

17. The machine of claim 16, wherein:
the first polycrystalline diamond bearing element tiltable relative to the socket;
a spring is coupled between the first polycrystalline diamond bearing element and the socket; or
combinations thereof.

18. The machine of claim 1, wherein the diamond solvent-catalyst is iron, cobalt, nickel, ruthenium, rhodium, palladium, chromium, manganese, copper, titanium, tantalum, or a combination thereof.

19. The machine of claim 1, wherein the first metal is softer than a superhard material.

20. The machine of claim 1, wherein the first metal is an alloy.

21. The machine of claim 1, wherein the first metal contains from 55 to 100 weight percent of the diamond solvent-catalyst based on the total weight of the first metal.

22. The machine of claim 1, wherein the first metal is steel.

23. The machine of claim 1, wherein the first polycrystalline diamond bearing element comprises a polycrystalline diamond compact.

24. The machine of claim 1, wherein the machine is a motor, turbine, gearbox, pump, or compressor.

25. The machine of claim 1, wherein the rotor is a drive shaft and the stator is a bearing housing.

26. The machine of claim 1, wherein the first diamond bearing surface has a surface finish of 0.508 microns or less.

27. A drilling machine, the machine comprising:
a stator;
a rotor positioned within the stator;
a drive shaft coupled with the rotor; and
a drill bit coupled with the drive shaft;

wherein one of the stator and the rotor comprises a first metal bearing surface, the first metal bearing surface comprising a first metal that contains at least 2 weight percent of a diamond solvent-catalyst based on a total weight of the first metal;

a first polycrystalline diamond bearing element having a first diamond bearing surface, wherein the first polycrystalline diamond bearing element is positioned such that the first diamond bearing surface is engaged with the first metal bearing surface; and wherein the first polycrystalline diamond bearing element is compliant relative to the first metal bearing surface such that a distance between the first diamond bearing surface and the first metal bearing surface is variable.

28. The machine of claim 27, wherein the drive shaft is positioned within a housing;

wherein one of the housing and the drive shaft comprises a second metal bearing surface, the second metal bearing surface comprising a second metal that contains at least 2 weight percent of a diamond solvent-catalyst based on a total weight of the second metal;

a second polycrystalline diamond bearing element having a second diamond bearing surface, wherein the second polycrystalline diamond bearing element is positioned such that the second diamond bearing surface is engaged with the second metal bearing surface; and wherein the second polycrystalline diamond bearing element is compliant relative to the second metal bearing surface such that a distance between the second diamond bearing surface and the second metal bearing surface is variable.

29. The drilling machine of claim 27, wherein the first diamond bearing surface has a surface finish of 0.508 microns or less.

30. A machine, the machine comprising:

a stator having a first end and a second end;

a rotor having a first end and a second end, wherein the rotor is positioned within the stator;

wherein one of the stator and the rotor comprises a first metal bearing surface, the first metal bearing surface comprising a first metal that contains at least 2 weight percent of a diamond solvent-catalyst based on a total weight of the first metal;

a first polycrystalline diamond bearing element having a first diamond bearing surface, wherein the first polycrystalline diamond bearing element is positioned such that the first diamond bearing surface is engaged with the first metal bearing surface at the first ends of the rotor and the stator; and wherein the first polycrystalline diamond bearing element is compliant relative to the first metal bearing surface such that a distance between the first diamond bearing surface and the first metal bearing surface is variable; and a second polycrystalline diamond bearing element having a second diamond bearing surface, wherein the second polycrystalline diamond bearing element is positioned such that the second diamond bearing surface is engaged with the first metal bearing surface at the second ends of the rotor and the stator; and wherein the second polycrystalline diamond bearing element is compliant relative to the first metal bearing surface such that a distance between the second diamond bearing surface and the first metal bearing surface is variable.

31. The machine of claim 30, wherein the first diamond bearing surface has a surface finish of 0.508 microns or less, and wherein the second diamond bearing surface has a surface finish of 0.508 microns or less.

* * * * *